United States Patent
Rettedal et al.

(10) Patent No.: US 12,127,532 B2
(45) Date of Patent: *Oct. 29, 2024

(54) ANIMAL ENVIRONMENTAL AND PHYSIOLOGICAL MONITORING SYSTEM

(71) Applicant: ST Reproductive Technologies, LLC, Navasota, TX (US)

(72) Inventors: Nicholas P. Rettedal, Berthoud, CO (US); Stephen M. Weilnau, Greeley, CO (US); Scott R. Cockroft, Greeley, CO (US); Joseph Janus, IV, College Station, TX (US)

(73) Assignee: ST Reproductive Technologies, LLC, Navasota, TX (US)

( * ) Notice: Subject to any disclaimer, the term of this patent is extended or adjusted under 35 U.S.C. 154(b) by 658 days.

This patent is subject to a terminal disclaimer.

(21) Appl. No.: 17/210,070

(22) Filed: Mar. 23, 2021

(65) Prior Publication Data

US 2021/0204515 A1    Jul. 8, 2021

Related U.S. Application Data

(63) Continuation of application No. 16/418,524, filed on May 21, 2019, now Pat. No. 11,206,811, which is a
(Continued)

(51) Int. Cl.
*A01K 11/00*    (2006.01)
*A01K 29/00*    (2006.01)
(Continued)

(52) U.S. Cl.
CPC .......... *A01K 11/007* (2013.01); *A01K 11/008* (2013.01); *A01K 29/005* (2013.01); *G06F 3/0482* (2013.01); *G06F 3/04847* (2013.01)

(58) Field of Classification Search
CPC .. A01K 11/007; A01K 11/008; A01K 11/006; A01K 11/00; A01K 29/00; A61B 5/0002; A61B 5/0015; A61B 2503/40
See application file for complete search history.

(56) References Cited

U.S. PATENT DOCUMENTS 5,482,008 A    1/1996    Stafford et al.
5,532,692 A    7/1996    Tatsuya
(Continued)

FOREIGN PATENT DOCUMENTS

CN    102293643 A    7/2014
EP    2314154 A1    4/2011
(Continued)

OTHER PUBLICATIONS

Chinese Office Action issued on May 25, 2021 in related CN Appl No. 201680080457.5.
(Continued)

*Primary Examiner* — Trinh T Nguyen
(74) *Attorney, Agent, or Firm* — Ryan Christensen; Hashim Rahman

(57) ABSTRACT

Generally, an animal monitoring system including a bolus administered to reside in an animal operable to sense changes in one or more physiological parameters of the animal and generate and transmit encoded bolus sensor data to a tag affixed on the outside of the animal which operates to sense changes in one or more environmental parameters surrounding the animal and to generate encoded tag sensor data and to receive encoded bolus sensor data each of which can be analyzed by the tag or a remote data processor to generate environmental parameter values and physiological parameter values to assess an environmental or physiological condition of or about the animal.

11 Claims, 15 Drawing Sheets

Related U.S. Application Data continuation of application No. 14/970,289, filed on Dec. 15, 2015, now Pat. No. 10,306,868.

(51) Int. Cl.
  *G06F 3/0482* (2013.01)
  *G06F 3/04847* (2022.01)

(56) References Cited

U.S. PATENT DOCUMENTS

| | | |
|---|---|---|
| 5,818,354 A | 10/1998 | Gentry |
| 5,963,132 A | 10/1999 | Yoakum |
| 5,984,875 A | 11/1999 | Brune |
| 6,059,733 A | 5/2000 | Brune et al. |
| 6,085,751 A | 7/2000 | Taparia |
| 6,099,482 A | 8/2000 | Brune et al. |
| 6,371,927 B1 | 4/2002 | Brune et al. |
| 6,416,782 B1 | 7/2002 | Maas |
| 6,702,185 B1 | 3/2004 | Zercher |
| 7,441,515 B2 | 10/2008 | Renz et al. |
| 7,962,096 B2 | 6/2011 | Cox |
| 8,001,168 B2 | 8/2011 | Tsuyuzaki |
| 8,545,436 B2 | 10/2013 | Robertson et al. |
| 8,547,248 B2 | 10/2013 | Zdeblich et al. |
| 8,588,887 B2 | 11/2013 | Arneson et al. |
| 8,640,712 B2 | 2/2014 | Ardrey, Jr. |
| 8,694,091 B2 | 4/2014 | Birk et al. |
| 8,771,201 B2 | 7/2014 | Gabriel et al. |
| 8,823,515 B2 | 9/2014 | Rettedal et al. |
| 2001/0001176 A1 | 5/2001 | Caja Lopez et al. |
| 2002/0128542 A1 | 9/2002 | Van Over |
| 2004/0133131 A1 | 7/2004 | Kuhn et al. |
| 2004/0155782 A1 | 8/2004 | Letkomiller et al. |
| 2005/0134452 A1 | 6/2005 | Smith |
| 2005/0145187 A1 | 7/2005 | Gray |
| 2007/0156016 A1 | 5/2007 | Betesh et al. |
| 2007/0136154 A1 | 6/2007 | Chung |
| 2008/0104209 A1 | 5/2008 | Singhai et al. |
| 2008/0236500 A1 | 10/2008 | Hodges et al. |
| 2008/0314325 A1 | 12/2008 | Hempstead et al. |
| 2009/0030279 A1 | 1/2009 | Zander et al. |
| 2009/0182207 A1 | 7/2009 | Riskey et al. |
| 2009/0187392 A1 | 7/2009 | Riskey et al. |
| 2010/0030025 A1 | 2/2010 | Segawa et al. |
| 2010/0030036 A1 | 2/2010 | Mottram |
| 2010/0302039 A1 | 12/2010 | Goto |
| 2011/0212782 A1 | 9/2011 | Thompson et al. |
| 2011/0301437 A1 | 12/2011 | Gabriel et al. |
| 2012/0068848 A1 | 3/2012 | Campbell et al. |
| 2013/0197323 A1 | 8/2013 | Rettedal et al. |
| 2013/0231188 A1 | 9/2013 | Berberich et al. |
| 2014/0240088 A1 | 8/2014 | Robinette |
| 2014/0336524 A1 | 11/2014 | Stewart |
| 2014/0368338 A1 | 12/2014 | Rettedal et al. |

FOREIGN PATENT DOCUMENTS

| | | |
|---|---|---|
| GB | 2437250 A | 10/2007 |
| JP | 2007089892 A | 4/2007 |
| WO | 2011079338 A2 | 7/2011 |
| WO | 2012/054085 A2 | 4/2012 |
| WO | 2012173502 A1 | 12/2012 |
| WO | 2014/145552 A1 | 9/2014 |
| WO | 2015/145422 A1 | 10/2015 |
| WO | 2016201242 A1 | 12/2016 |

OTHER PUBLICATIONS

Australian Examination Report issued on Dec. 3, 2018 in related AU Application No. 2016370370.
New Zealand Examination Report issued on Dec. 18, 2018 in related NZ Application No. 743178.
International PCT Patent Application No. PCT/US2016/066012; International Search Report and Written Opinion dated Mar. 3, 2017, 9 pages total.
Carne et al. Modeling the retention of rumen boluses for the electronic identification of goats. J Dairy Sci, Feb. 2011, 94(2), pp. 716-726 (abstract only, 2 pages total).
Ghirardi et al. Retention of different sizes of electronic identification boluses in the forestomachs of sheep. J Anim Sci, Nov. 2006, 84(10), pp. 2865-2872.
European Patent Application No. 11834759.0; Office Action mailed May 24, 2016, 8 pages total.
Scanga et al. Development of computational models for the purpose of conducting individual livestock and premises traceback investigations utilizing National Animal System compliant data. Journal of Animal Science, Dec. 2007, vol. 85, Issue 12, pp. 503-511.
Boehmer et al. Effects of Temperature of Consumed Water on Rumen Temperature of Beef Cows. Oklahoma Agricultural Experiment Station, 2009, 4 total pages.
Caja et al. Development of a ceramic bolus for the permanent electronic identification of sheep, goat and cattle. Computers and Electronics in Agriculture (1999), vol. 24, pp.
Cooper-Prado, et al. Relationship of Ruminal Temperature with Parturition and Estrus of Beef Cows. J Anim Sci, Apr. 2011, 89:1020-1027; published ahead of print Dec. 17, 2011.
Fallon et al. Electronic Animal Identification. Grange Research Center, Beef Production Series No. 46, pp. 1-54.
Ghirardi et al. Evaluation of the retention of electronic identification boluses in the forestomachs of cattle. Journal of Animal Science (2006), vol. 84, pp. 2260-2268.
Smartstock USA. Website, http://www.smartstock-USA.com, originally downloaded Dec. 30, 2011, 12 total pages.
HACH. Digital Inductive Conductivity Sensor, Convertible Body Style. Website, http:/www.hach.com, product page downloaded Mar. 5, 2014, 2 total pages.
European Search Report issued on Jul. 24, 2019 in related EP Appl No. 16876431.4.
Chinese Office Action issued on Jul. 29, 2020 in related CN Appl. No. 201680080457.5.
European Search Report received on Mar. 30, 2021 in related EP Appl No. 21150422.0.
New Zealand Office Action issued on Aug. 19, 2021 in related NZ Appl. No. 758232.
New Zealand Office Action issued on Feb. 23, 2022 in related NZ Appl. No. 758232.
CN Office Action dated Feb. 29, 24 issued in related CN Application No. 2021115694496 filed Dec. 21, 2021.

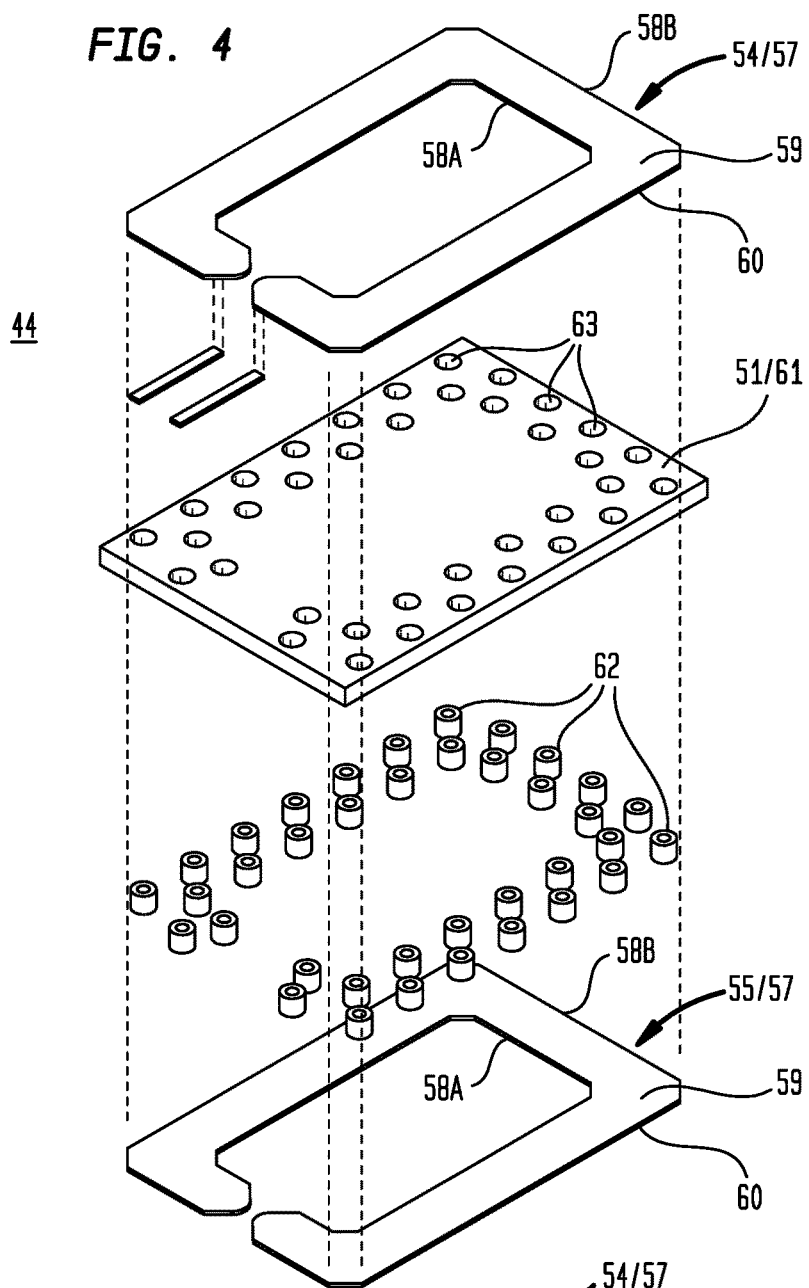
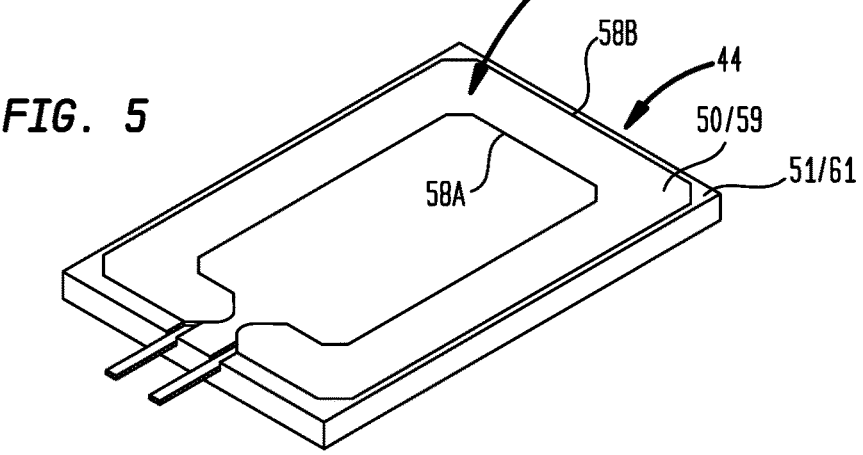

FIG. 8D

| ID NUMBER | 1234 |
|---|---|
| DAYS IN MILK | 0 |
| DAYS SINCE HEAT | 0 |
| SENSOR DATA | C-104.7 A-87 M-3 |
| SETTINGS | - |

BUTTON 1  BUTTON 2

FIG. 8D'

| ID NUMBER | 1234 |
|---|---|
| DAYS IN MILK | 0 |
| DAYS SINCE HEAT | 0 |
| SENSOR DATA | C-104.7 A-87 M-3 |
| SETTINGS | - |

BUTTON 1  BUTTON 2

FIG. 8E

| ID NUMBER | 1234 |
|---|---|
| DAYS IN MILK | 0 |
| DAYS SINCE HEAT | 0 |
| SENSOR DATA | C-104.7 A-87 M-3 |
| SETTINGS | - |

BUTTON 1  BUTTON 2

FIG. 8E'

| ID NUMBER | 1234 |
|---|---|
| YES | IN HEAT? |
| EXIT | - |
| - | - |
| SETTINGS | - |

BUTTON 1  BUTTON 2

FIG. 8F

| ID NUMBER | 1234 |
|---|---|
| YES | IN HEAT? |
| EXIT | - |
| - | - |
| SETTINGS | - |

BUTTON 1  BUTTON 2

FIG. 8F'

| ID NUMBER | 1234 |
|---|---|
| DAYS IN MILK | 0 |
| DAYS SINCE HEAT | 1 |
| SENSOR DATA | C-104.7 A-87 M-3 |
| SETTINGS | - |

BUTTON 1  BUTTON 2

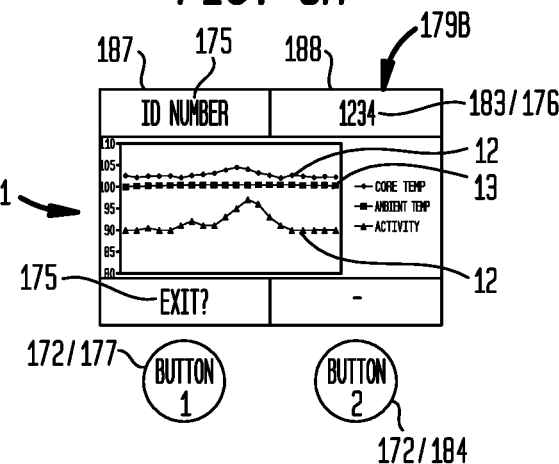
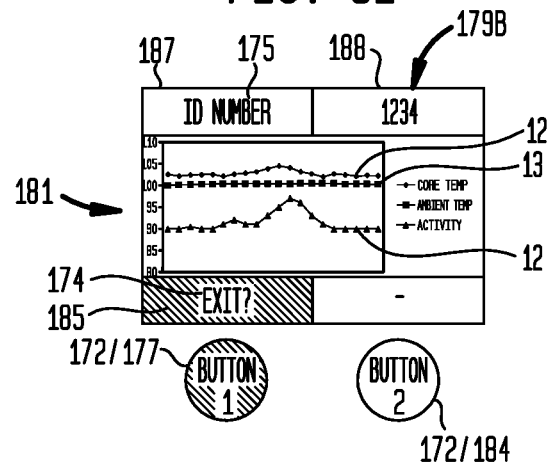

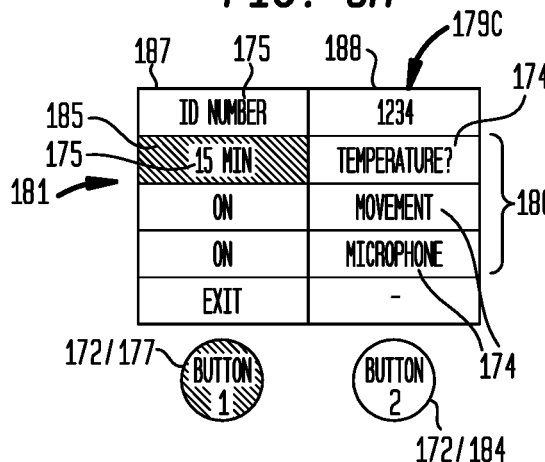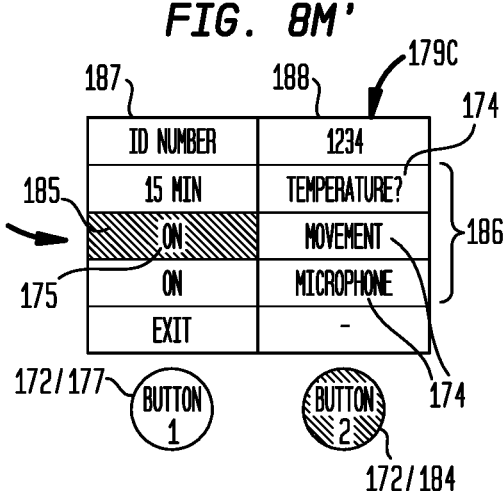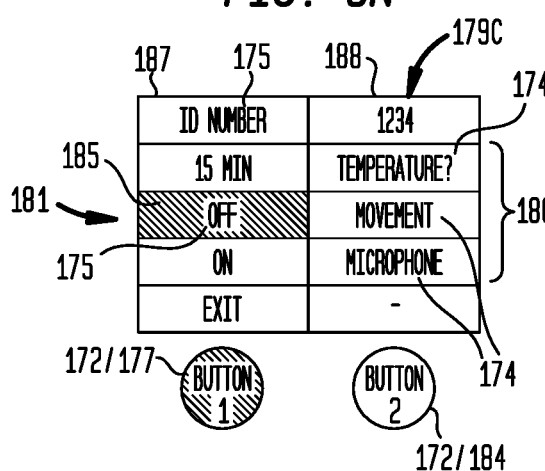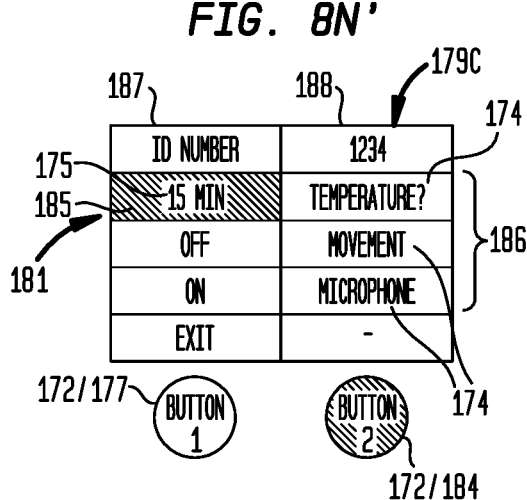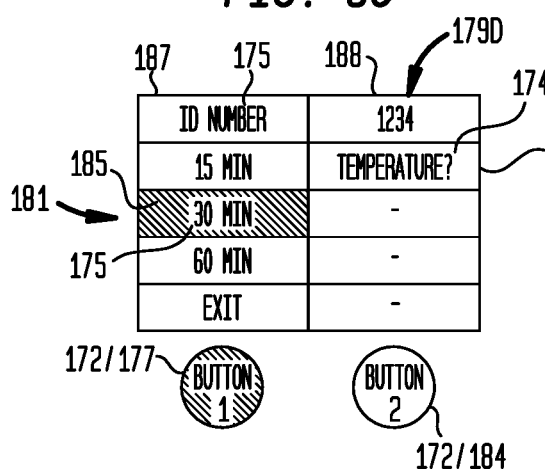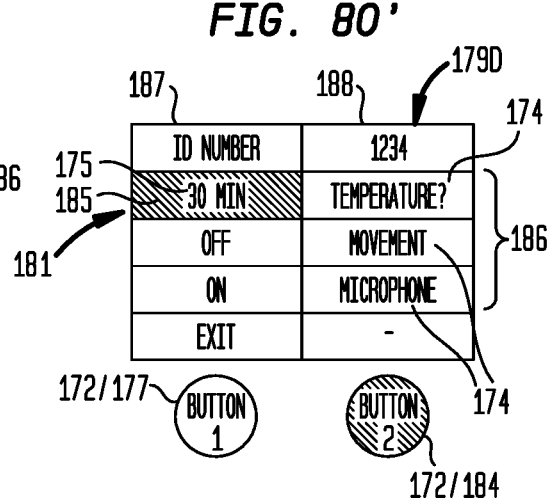

FIG. 8P

| ID NUMBER | 1234 |
|---|---|
| DAYS IN MILK | 0 |
| DAYS SINCE HEAT | 0 |
| SENSOR DATA | C-104.7 A-87 M-3 |
| SETTINGS | - |

BUTTON 1  BUTTON 2

FIG. 8P'

| YES | INTERNAL DEVICE PAIRING? |
|---|---|
| ID NUMBER | ANIMAL ID |
| COMM METHOD | COMMUNICATION METHOD |
| - | - |
| EXIT | - |

BUTTON 1  BUTTON 2

FIG. 8Q

| YES | INTERNAL DEVICE PAIRING? |
|---|---|
| ID NUMBER | ANIMAL ID |
| COMM METHOD | COMMUNICATION METHOD |
| - | - |
| EXIT | - |

BUTTON 1  BUTTON 2

FIG. 8Q'

| 1000001 | PAIRING: |
|---|---|
| 1000002 | SELECT DEVICE |
| - | TO THE LEFT |
| - | - |
| EXIT | - |

BUTTON 1  BUTTON 2

FIG. 8R

| 1000001 | PAIRING: |
|---|---|
| 1000002 | SELECT DEVICE |
| - | TO THE LEFT |
| - | - |
| EXIT | - |

BUTTON 1  BUTTON 2

FIG. 8R'

| - | PAIRED!!! |
|---|---|
| 1000002 | INTERNAL DEVICE |
| - | - |
| RE-RUN PAIRING | - |
| EXIT | - |

BUTTON 1  BUTTON 2

FIG. 8S

| ID NUMBER | 1234 |
|---|---|
| DAYS IN MILK | 0 |
| DAYS SINCE HEAT | 0 |
| SENSOR DATA | C-104.7 A-87 M-3 |
| SETTINGS | - |

FIG. 8S'

| YES | INTERNAL DEVICE PAIRING? |
|---|---|
| ID NUMBER | ANIMAL ID |
| COMM METHOD | COMMUNICATION METHOD |
| - | - |
| EXIT | - |

FIG. 8T

| YES | INTERNAL DEVICE PAIRING? |
|---|---|
| ID NUMBER | ANIMAL ID |
| COMM METHOD | COMMUNICATION METHOD |
| - | - |
| EXIT | - |

FIG. 8T'

| YES | ENTER |
|---|---|
| - | ANIMAL |
| - | MANAGEMENT |
| - | ID? |
| EXIT | - |

FIG. 8U

| YES | ENTER |
|---|---|
| - | ANIMAL |
| - | MANAGEMENT |
| - | ID? |
| EXIT | - |

FIG. 8U'

| 1 | 2 | 3 |
|---|---|---|
| 4 | 5 | 6 |
| 7 | 8 | 9 |
| EXIT | 0 | SAVE |
| 7- | | ID NUMBER |

FIG. 8V

| ID NUMBER | 1234 |
|---|---|
| DAYS IN MILK | 0 |
| DAYS SINCE HEAT | 0 |
| SENSOR DATA | C-104.7 A-87 M-3 |
| SETTINGS | - |

FIG. 8V'

| YES | INTERNAL DEVICE PAIRING? |
|---|---|
| ID NUMBER | ANIMAL ID |
| COMM METHOD | COMMUNICATION METHOD |
| - | - |
| EXIT | - |

FIG. 8W

| YES | INTERNAL DEVICE PAIRING? |
|---|---|
| ID NUMBER | ANIMAL ID |
| COMM METHOD | COMMUNICATION METHOD |
| - | - |
| EXIT | - |

FIG. 8W'

| NO | LOCAL COLLECTOR? |
|---|---|
| NO | ACTIVATE CELLULAR? |
| NO | CONNECT BLUETOOTH? |
| - | - |
| EXIT | - |

FIG. 8X

| NO | LOCAL COLLECTOR? |
|---|---|
| NO | ACTIVATE CELLULAR? |
| NO | CONNECT BLUETOOTH? |
| - | - |
| EXIT | - |

FIG. 8X'

| - | LOCAL COLLECTOR? |
|---|---|
| YES | ACTIVATE CELLULAR? |
| - | CONNECT BLUETOOTH? |
| - | - |
| EXIT | - |

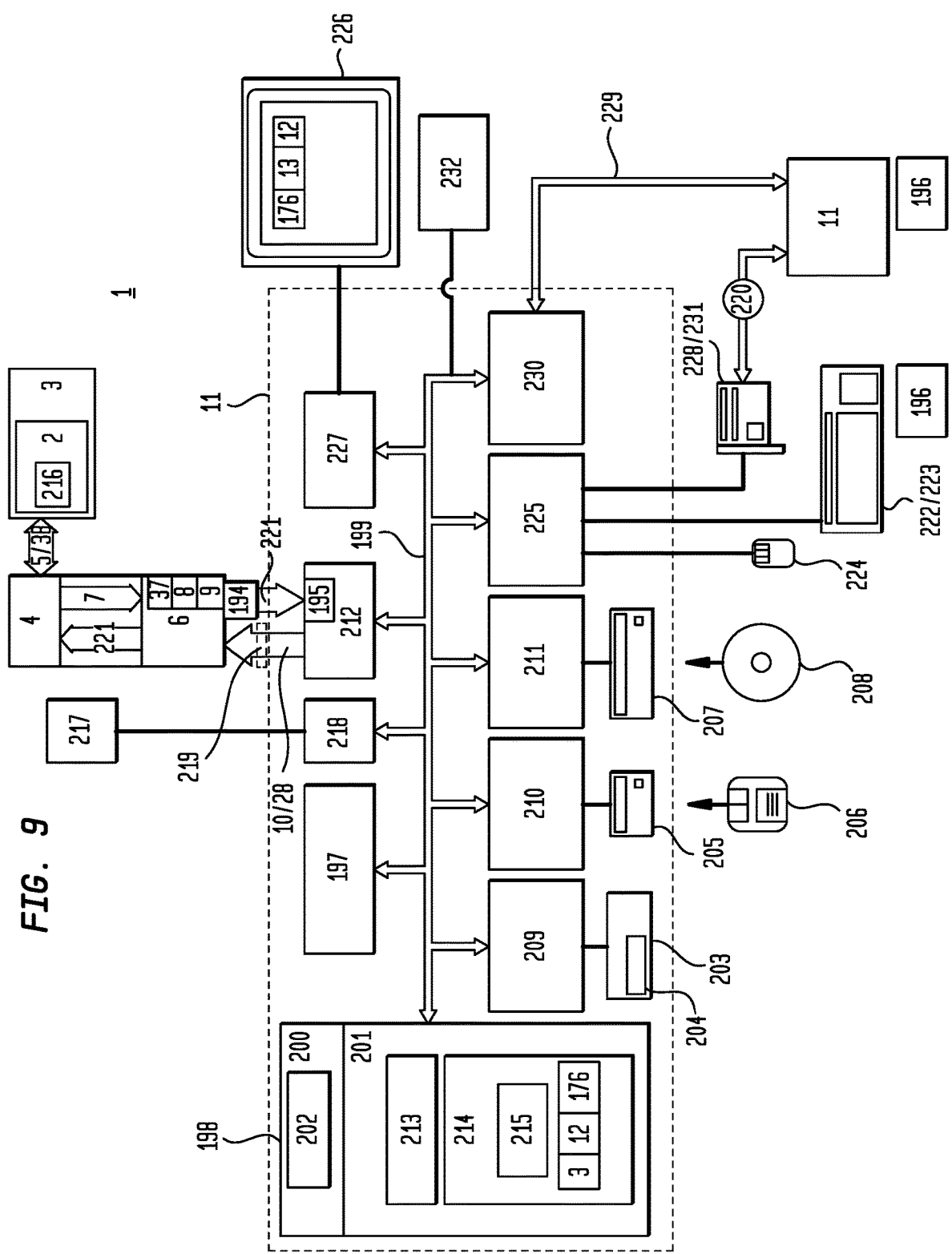

US 12,127,532 B2

ANIMAL ENVIRONMENTAL AND PHYSIOLOGICAL MONITORING SYSTEM

PRIORITY

This application is a continuation of U.S. patent application Ser. No. 16/418,524, filed May 20, 2019, which is a continuation of U.S. patent application Ser. No. 14/970,289, filed Dec. 15, 2015, now U.S. Pat. No. 10,306,868, issued Jun. 3, 2019.

I. FIELD OF THE INVENTION

Generally, an animal monitoring system including a bolus administered to reside in an animal operable to sense changes in one or more physiological parameters of the animal and generate and transmit encoded bolus sensor data to a tag affixed on the outside of the animal which operates to sense changes in one or more environmental parameters surrounding the animal and to generate encoded tag sensor data and to receive encoded bolus sensor data each of which can be analyzed by the tag or a remote data processor to generate environmental parameter values and physiological parameter values to assess an environmental condition surrounding the animal or the physiological condition of the animal.

II. BACKGROUND OF THE INVENTION

Animal monitoring systems including a bolus administered to reside in an animal may send encoded bolus sensor data to a remote processor for analysis. However, a remote processor may not be available to the user working with animals in the field or the remote processor may experience delay in analysis or loss of encoded sensor data due to incompatibility of the hardware or software with the bolus hardware or software, conflict with or competition with other programs executed by the remote processor, or inoperability of the remote processor.

There would be an advantage in an animal monitoring system that paired the bolus residing in the animal with a tag removably or permanently affixed to the animal's external surface allowing the user to access physiological data and environmental data relating to an animal and reprogram the operational parameters of the bolus or the tag by user interaction with the tag while in the field with the animal.

III. SUMMARY OF THE INVENTION

A broad object of the invention can be to provide a bolus which can reside in an animal which can be communicatively coupled or paired with a tag affixed to the animal external surface allowing concurrent collection of physiological data relating to physiological parameters of the animal and environmental data relating environmental parameters surrounding the animal.

Another broad object of the invention can be to provide an tag affixable to the external surface of an animal which includes a first communication signal transceiver which generates a first communication signal frequency for communication with the bolus and which further includes a second communication signal transceiver which generates a second communication signal frequency for communication with a remote signal transceiver or a remote processor.

Another broad object of the invention can be to provide an tag affixable to the external surface of an animal which includes a manual user interface which allows a user access to the physiological data relating to physiological parameters of the animal collected by the bolus, and to the environmental data relating to the environmental parameters surrounding the animal collected by the tag, over a period of time and by user interaction with the manual user interface reprogram the operating parameters of each one of the bolus and the tag in the field without the use of a remote signal transceiver or remote processor.

Naturally, further objects of the invention are disclosed throughout other areas of the specification, drawings, photographs, and claims.

IV. BRIEF DESCRIPTION OF THE DRAWINGS

FIG. 4 is an exploded view of a particular embodiment of an antenna included in the particular embodiment of the bolus shown in FIGS. 2 and 3.

FIG. 5 is a top perspective view of the particular embodiment of the antenna shown in FIG. 4 having first and second electrically conductive loops disposed on the opposed surfaces of a non-electrically conductive sheet material.

Figure 8A:
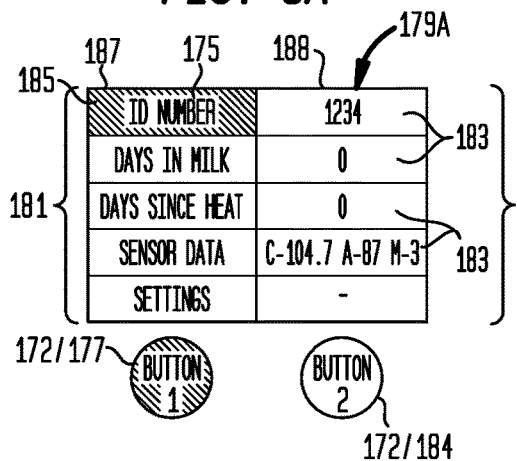
FIG. 8A is an illustration of an embodiment of the manual user interface included in the tag shown in FIG. 6 having a first menu displayed on a display surface and a first manual user interface element operable to serially advance a menu cursor through a plurality of parameter control fields in the first column of the menu.
Figure 8A:
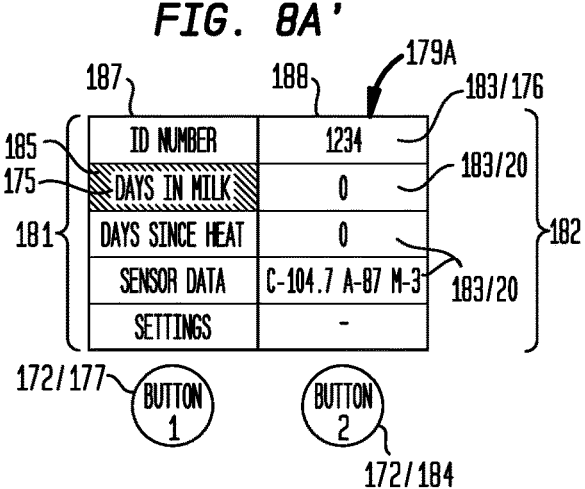

FIG. 8A' is an illustration of the first menu shown in FIG. 8A having the menu cursor advanced in the plurality of parameter control fields in the menu first column by operation of the first manual user interface element.

Figure 8B:
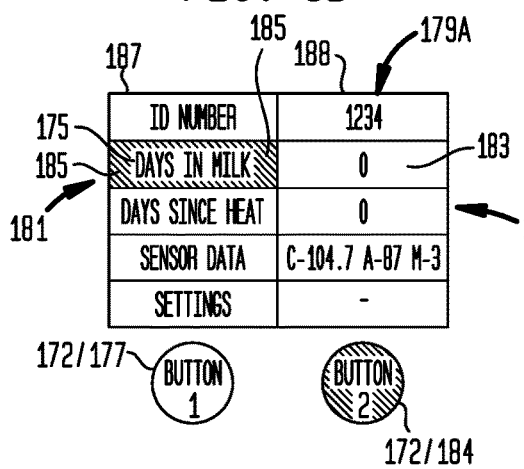
Figure 8B:
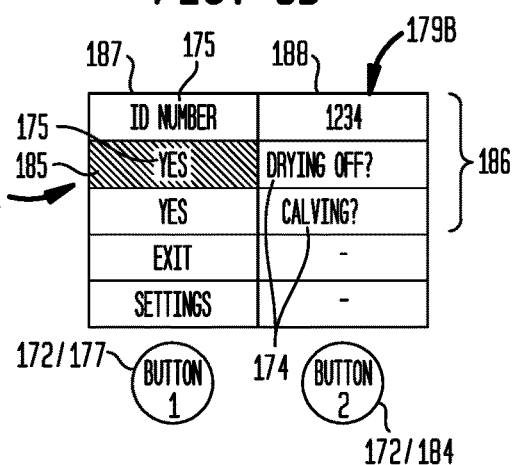

FIG. 8B is an illustration of the menu shown in FIG. 8A' having the menu cursor advanced in the plurality of parameter control fields in the first menu column to "Days In Milk" and by operation of a second manual user interface element a second menu can be displayed in which operating parameter fields containing operating parameters related to the selected parameter control field "Days In Milk".

FIG. 8B' is an illustration of the second menu generated in response to operation of the second manual user interface.

Figure 8C:
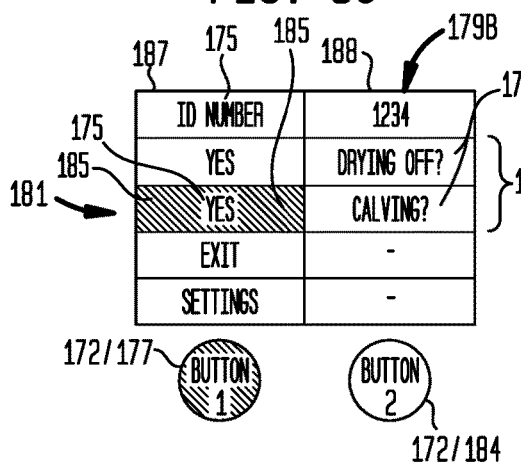
Figure 8C:
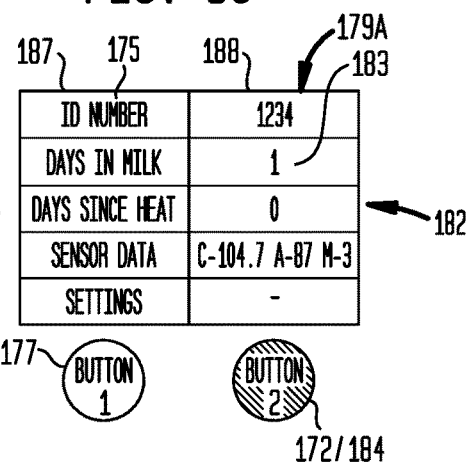

FIG. 8C is an illustration of the second menu shown in FIG. 8B' having the menu cursor advanced in a plurality of parameter control fields in the second menu first column by operation of the first manual user interface.

FIG. 8C' is an illustration of the second menu shown in FIG. 8C which by operation of the second manual user interface activates the function of the selected parameter control field in menu first column of the second menu.

FIG. 8D is an illustration of the first menu shown in FIG. 8A in which the menu cursor can be advanced in the plurality of parameter control fields in the first column of the first menu.

FIG. 8D' is an illustration of the first menu shown in FIG. 8A in which the menu cursor has been advanced by operation of the first manual user interface to the parameter control field containing the parameter control value "Days Since Heat."

FIG. 8E is an illustration of the first menu shown in 8D' which by operation of the second manual user interface element causes a second menu to be displayed in which operating parameters related to the selected parameter control value "Days Since Heat" are contained in operating parameter fields in the second menu column of the second menu.

FIG. 8E' is an illustration of the second menu including operating parameter fields containing operating parameters related to the selected parameter control value "Days Since Heat".

FIG. 8F is an illustration of the second menu in which the menu cursor can be advanced through parameter control fields in the menu first column by operation of the first manual user interface to the parameter control field containing the parameter value "Yes" adjacent the parameter value field in the menu second column containing the parameter value "In Heat".

FIG. 8F' is an illustration of the second menu shown in FIG. 8F which by operation of the second manual user interface activates selects the parameter control field containing the parameter control value "Yes" in the first column of the second menu.

FIG. 8G is an illustration of the first menu shown in FIG. 8A in which the menu cursor can be advanced in the plurality of parameter control fields in the menu first column of the first menu by operation of the first manual user interface.

FIG. 8G' is an illustration of the first menu shown in FIG. 8A in which the menu cursor has been advanced by operation of the first manual user interface to the parameter control field containing the parameter control value "Sensor Data."

FIG. 8H is an illustration of the first menu shown in FIG. 8G' which by operation of the second manual user interface element selects the parameter control value "Sensor Data" to display a second menu in which graphed data is displayed relating to sensed environmental parameters and sensed physiological parameters.

FIG. 8H' is an illustration of the second menu which displays graphed data relating to sensed environmental parameters and sensed physiological parameters.

FIG. 8I is an illustration of the second menu shown in FIG. 8H' in which the menu cursor can be advanced in the menu first column to "Exit" by operation of the first manual user interface element.

FIG. 8I' is an illustration of the first menu 8A which can be displayed by operation of the second manual user interface element when the menu cursor is in the parameter control field containing the parameter control value "Exit".

Figure 8J:
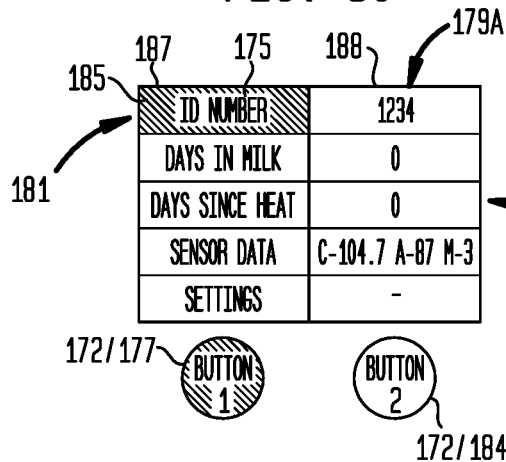
Figure 8J:
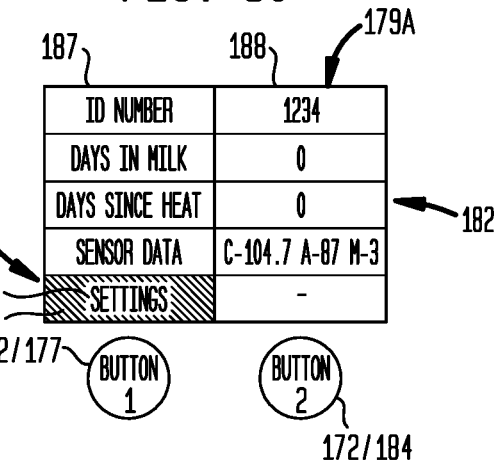

FIG. 8J is an illustration of the first menu 8A in which the menu cursor can be advanced in the plurality of parameter control fields in the menu first column.

FIG. 8J' is an illustration of the first menu 8A in which the menu cursor has been advanced by operation of the first manual user interface to the parameter control field containing the parameter control value "Settings."

Figure 8K:
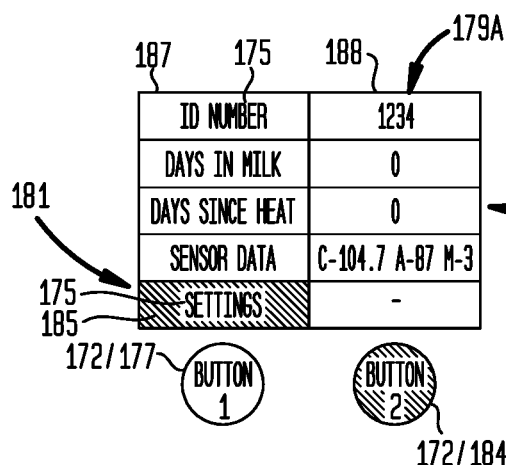
Figure 8K:
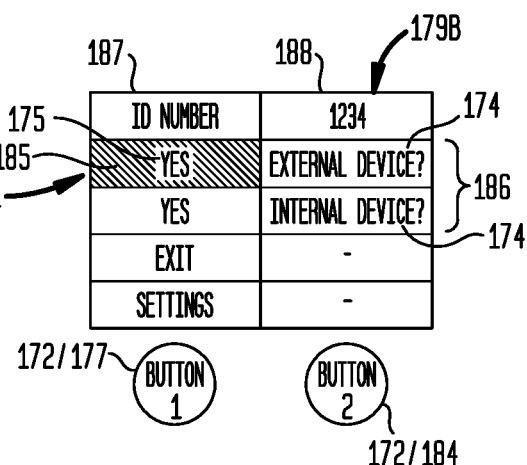

FIG. 8K is an illustration of the first menu in which the menu cursor has been advanced by operation of the first manual user interface to "Settings" which by operation of the second manual user interface element causes a second menu to be displayed including operating parameter fields in a menu second column containing operating parameters related to "Settings".

FIG. 8K' is an illustration of the second menu displayed by operation of the second manual user interface.

Figure 8L:
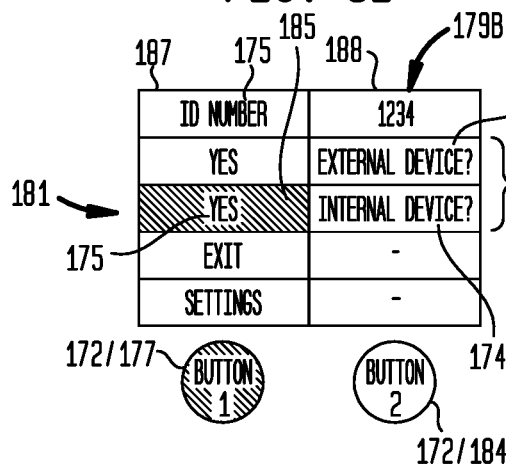
Figure 8L:
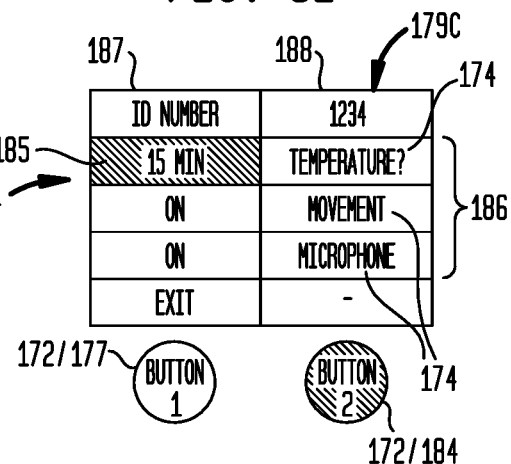

FIG. 8L is an illustration of the second menu shown in FIG. 8K' in which the menu cursor can be advanced through parameter control fields in the menu first column by serial operation of the first manual user interface to the parameter control field containing the parameter control value "Yes" adjacent the operating parameter field containing the operating parameter "Internal Device".

FIG. 8L' is an illustration of at third menu displayed by operation of a second manual user interface element in which operational parameters related to the "Internal Device" are displayed in operating parameter fields in the menu second column.

FIG. 8M is an illustration of the third menu shown in FIG. 8L' in which operation of the first manual interface element advances the menu cursor through a plurality of parameter control fields in the menu first column.

FIG. 8M' is an illustration of the third menu shown in FIG. 8L' in which the menu cursor has been advanced to the parameter control field containing the parameter control value "On" adjacent the operating parameter field containing the operating parameter "Movement" and operation of the second manual user interface element activates the selected parameter control field.

FIG. 8N is an illustration of the third menu shown in FIG. 8M' in which the parameter control value "On" adjacent to the operating parameter "Movement" has been changed to "Off" by operation of the second manual user interface element.

FIG. 8N' is an illustration of the third menu shown in FIG. 8N in which the cursor has been advanced parameter control field containing the parameter control value "15 Minutes" adjacent the operating parameter field containing the operating parameter "Temperature" and by operation of the second manual user interface the functionality of the selected parameter control field is activated to display a fourth menu.

FIG. 8O is an illustration of the fourth menu in which the menu cursor can be advanced through a plurality of parameter control fields in the first column of the fourth menu by operation of the first manual user interface.

FIG. 8O' is an illustration of the fourth menu in which one of the plurality of parameter control fields containing the parameter control value "30 Minutes" can be selected by operation of the second manual user interface.

FIG. 8P is an illustration of the first menu shown in FIG. 8A in which the menu cursor can has been advanced through the plurality of parameter control fields in the menu first column by operation of the first manual user interface element to the parameter control field containing the parameter control value "ID Number."

FIG. 8P' is an illustration of a second menu displayed by operation of the second manual user interface to select the parameter control field containing the parameter control value "ID Number".

FIG. 8Q is an illustration of the second menu in which the menu cursor can be advanced through a plurality of parameter control fields in the menu first column by operation of the first manual user interface element to the parameter control filed containing the parameter control value "Yes" adjacent the operating parameter field containing the operating parameter "Internal Device Pairing."

FIG. 8Q' is an illustration of a third menu displayed by operation of the second manual user interface element to select the parameter control filed containing the parameter control value "Yes" adjacent the operating parameter field containing the operating parameter "Internal Device Pairing."

FIG. 8R is an illustration of the third menu shown in FIG. 8Q' and by operation of the first manual user interface element the menu cursor can be advanced through a plurality of parameter control fields in the menu first column to the parameter control field containing the parameter control value "100002" adjacent the operating parameter filed containing to operating parameter "Pairing: Select Device".

FIG. 8R' is an illustration of a fourth menu displayed by operation of the second manual user interface element to select the parameter control field containing the parameter control value "100002" which shows that the parameter control value "1000002" has been assigned to paired bolus and tag.

FIG. 8S is an illustration of the first menu shown in FIG. 8A in which operation of the first manual interface element serially advances a menu cursor through a plurality of parameter control fields in the first column to the parameter control field containing the parameter control value "ID Number".

FIG. 8S' is an illustration of the second menu shown in FIG. 8P' displayed by selection of the parameter control field containing the parameter control value "ID Number" by operation of the second manual user interface element.

FIG. 8T is an illustration of the second menu shown in FIG. 8S' in which the menu cursor has been advanced in the menu first column to the parameter control field containing the parameter control value "ID Number" by operation of the first manual user interface element.

FIG. 8T' is an illustration of a third menu displayed by operation of the second manual user interface to select parameter control field containing the parameter control value "ID Number".

FIG. 8U is an illustration of the third menu shown in FIG. 8T' in which the first manual user interface can be serially operated to advance the menu cursor through a plurality of parameter control fields to the parameter control field containing the parameter control value "Yes" adjacent the operating parameter field containing the operating parameter "Enter Animal Management ID".

FIG. 8U' is an illustration of a fourth menu displayed by operation of the second manual user interface to select the parameter control field containing the parameter control value "ID Number" including a key pad in which by operation of the first manual user interface the menu cursor can be advanced through a plurality of keys in the key pad and by operation of the second manual user interface element keys in the key pad can be selected to create an animal identification number which, by operation of the first manual user interface element to advance the menu cursor to the parameter control field containing the parameter control value "Save", can by subsequent operation of the second manual user interface be associated with the paired set of bolus and tag devices.

FIG. 8V is an illustration of the first menu shown in FIG. 8A in which by operation of the first manual interface element serially advances a menu cursor through a plurality of parameter control fields in the first column to the parameter control field containing the parameter control value "ID Number".

FIG. 8V' is an illustration of the second menu shown in FIG. 8P' displayed by selection of the parameter control filed containing the parameter control value "ID Number" by operation of the second manual user interface element.

FIG. 8W is an illustration of the second menu shown in FIG. 8V' in which the menu cursor has been advanced in the menu first column to the parameter control field containing the parameter control value "Communication Method" by operation of the first manual user interface element.

FIG. 8W' is an illustration of a third menu displayed by operation of the second manual user interface to select the parameter control field containing the parameter control value "Communication Method".

FIG. 8X is an illustration of the third menu shown in FIG. 8W' in which the first manual user interface can be serially operated to advance the menu cursor through a plurality of parameter control fields to the parameter control filed containing the parameter control value "No" adjacent the operating parameter field containing the operating parameter "Activate Cellular".

FIG. 8X' is an illustration of a fourth menu displayed by operation of the second manual user interface to select the parameter control field containing the parameter control value "No" which by subsequent operation of the second manual user interface element activates the selected communication method and displays the parameter control value "Yes" in the parameter control field adjacent the operating parameter field containing the operating parameter "Activate Cellular".

FIG. 9 is a block diagram of an embodiment of the inventive animal environmental and physiological monitoring system.

V. DETAILED DESCRIPTION OF THE INVENTION

Figure 1:
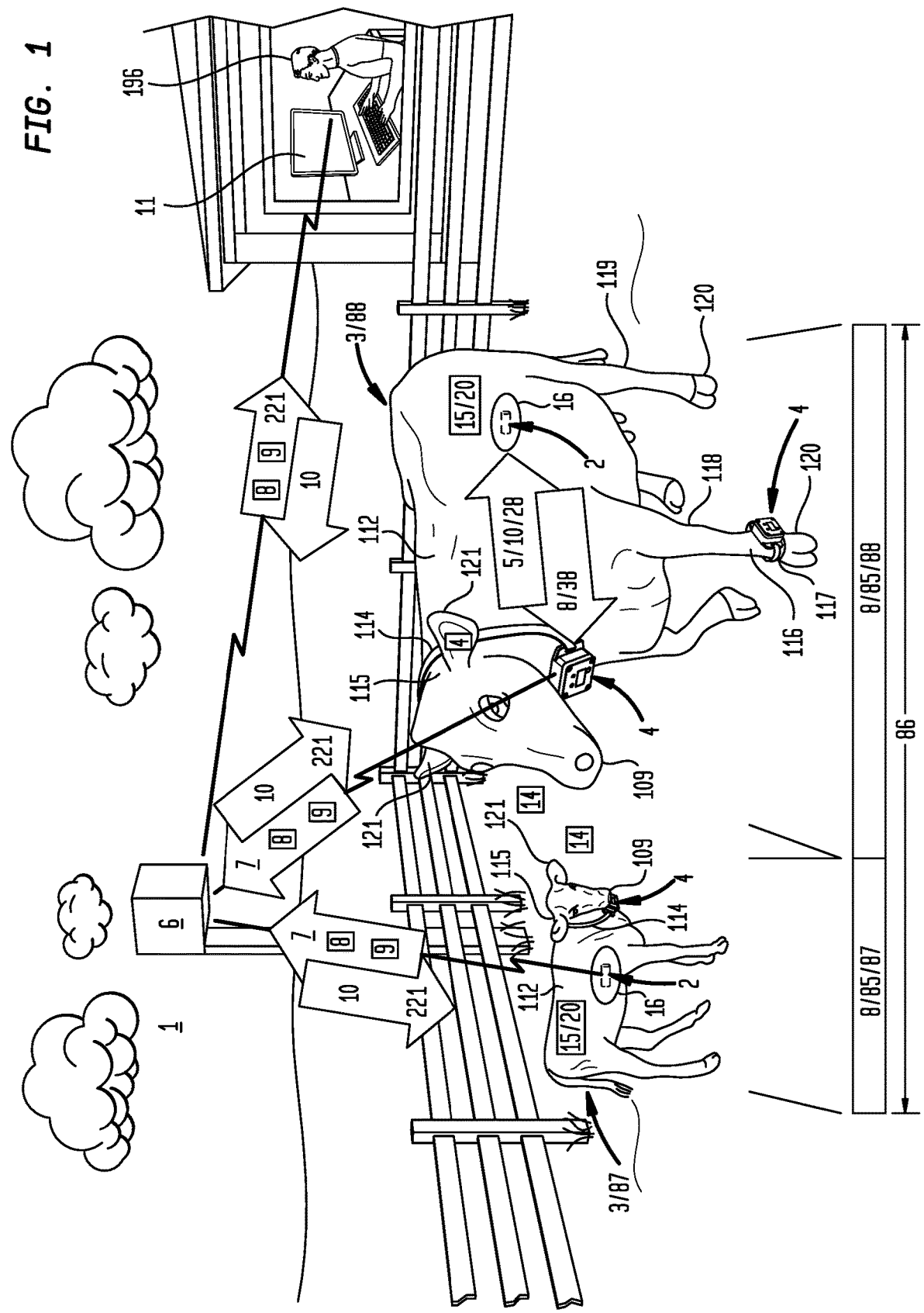
FIG. 1 is an illustration which shows a particular embodiment of the animal monitoring system.

Now referring primarily to FIG. 1, which illustrates a method of using particular embodiments of an animal monitoring system (1) which can include one or more of: a bolus (2) capable of being administered to reside in an animal (3), a tag (4) affixed to the outside of the animal (3) which can communicate with the bolus (2) by way of a first tag communication signal (5) or which can communicates with a remote processor (11) by way of a tag second communication signal (7)), whether directly, or indirectly by way of a remote signal transceiver (6) having a location discrete from the animal (3), each of the first or second tag communication signals (5)(7) can carry physiological parameter data (8) of the animal (3), environmental parameter data (9) of the environment surrounding the animal (3) or bolus programming data (10), and a remote processor (11) capable of analysis of physiological parameter data (8) or environmental parameter data (9) to generate environmental parameter values (12) and physiological parameter values (13) related to an environmental condition (14) or a physiological condition (15) of the animal (3).

For the purposes of this invention the term "animal" means any animal to which a bolus (2) can be administered (whether orally or otherwise) to reside within the animal (3), including, but not necessarily limited to, the suborder Ruminantia (both wild and domestic) and, without limiting the breadth of the foregoing definition, includes as illustrative examples: cattle, buffalo, goats, sheep, deer, antelope, giraffes, yaks, okapi, chevotain or the like.

For the purposes of this invention the term "reticulorumen" means the first chamber in the alimentary canal of an animal (3) of the suborder Ruminantia composed of the rumen and reticulum. The reticulum differs from the rumen with regard to the texture of its lining. The rumen wall is covered in small, finger-like projections called papillae, whereas the reticulum (16) is lined with ridges that form a hexagonal honeycomb pattern. Despite the differences in the texture of the lining of the two parts of the reticulorumen (16), it represents one functional space.

For the purposes of this invention the term "birth" means the emergence of the animal (3) from the body of its mother to begin life as a physically separate animal (3).

For the purposes of this invention the term "death" means the permanent cessation of vital bodily functions to end life of an animal (3).

For the purposes of this invention the term "life span" means the period of time between birth and death of an animal (3).

For the purposes of this invention the term "productive lifespan" means the period of time between birth and the age reached before the animal (3) is culled from production.

The animal monitoring system (1) in general, or as it relates to the bolus (2), the tag (4), the remote signal transceiver (6), the remote processor (11) or other components or elements, may be described herein in terms of functional block components and various process steps. It should be appreciated that such functional blocks may be realized by any number of hardware or software elements configured to perform the specified functions. For example, the elements included in various embodiments of the animal monitoring system (1) may employ various integrated circuit components which function as: memory elements, processing elements, logic elements, look-up tables, or the like, which may carry out a variety of functions under the control of one or more processors or other control devices.

The Bolus. Now referring primarily to FIGS. 1 through 3, as to particular embodiments, the bolus (2) can, but need not necessarily, include a bolus body (17) configured to allow oral administration to an animal (3), with certain embodiments having a configuration capable of being orally administered to an animal (3) immediately after birth. As to certain embodiments, the bolus can reside in the reticulorumen (16) of a ruminant animal (3) during the entire life span of the ruminant animal (3) from birth to death or from birth to the end of the productive lifespan of the ruminant animal (3). Embodiments of the bolus (2) include at least one bolus sensor (18) capable of generating a bolus sensor signal (19) which varies based on change in a corresponding sensed at least one physiological parameter (20) of the animal (3). The bolus (2) can further include a bolus memory element (21), which as to particular embodiments can be a reprogrammable memory element, and a bolus processor (22) in communication with a bolus memory element (21). A bolus computer code (23) contained in the bolus memory element (21) can be executed to convert analog signals (24) to digital signals (25), encode and decode physiological parameter data (8) and transform physiological parameter data (8) to generate physiological parameter values (13). Embodiments of the bolus (2) can further include a bolus communication signal generator (26) capable of generating a bolus communication signal (38) which can carry the encoded physiological parameter data (8) or physiological parameter values (13) from inside of the animal (3) to outside of the animal (3). As to particular embodiments, the bolus (2) can further include a bolus communication signal receiver (27) which can receive a bolus programming signal (28) carrying a bolus programming data (10) from outside of the animal (3) to the bolus (2) residing inside of the animal (3) to reprogram the bolus (2).

Figure 2:
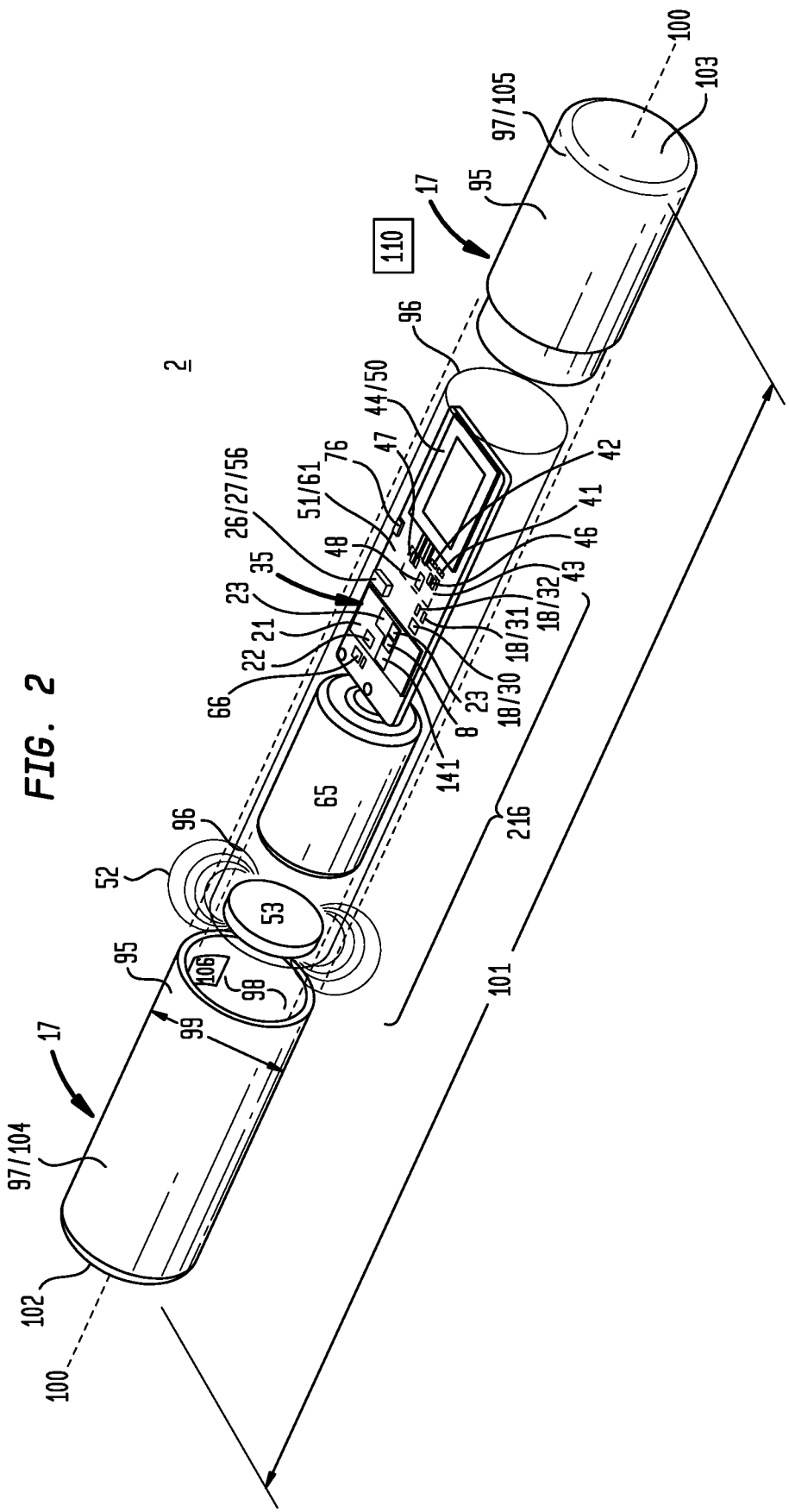
FIG. 2 is an exploded view of a particular embodiment of the bolus.
Figure 3:
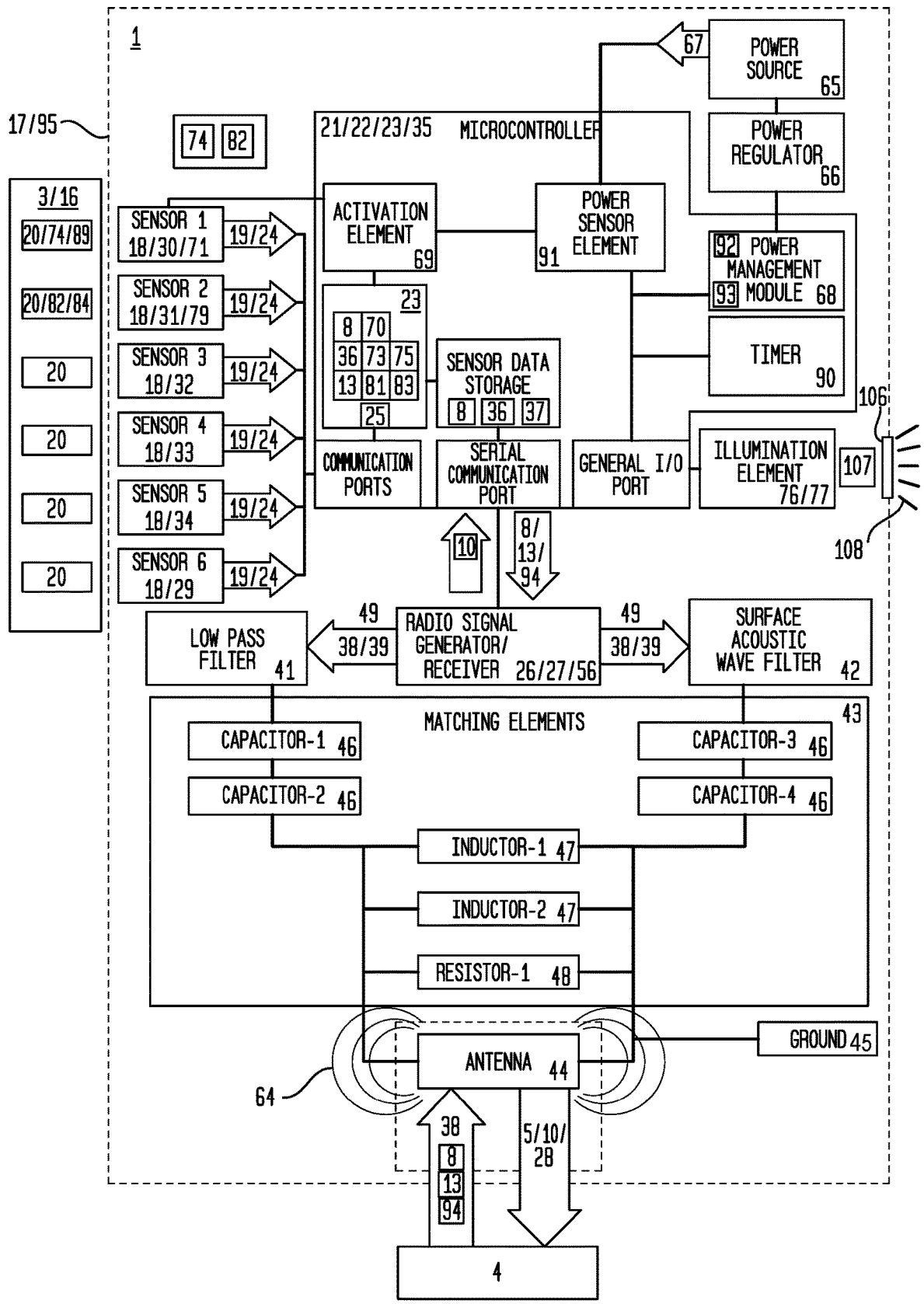
FIG. 3 is a block diagram of a particular embodiment of the bolus shown in FIG. 2.

Now referring primarily to FIGS. 2 and 3, which shows an illustrative example of a bolus (2) which includes at least one bolus sensor (18) each capable of generating at least one bolus sensor signal (19)(whether analog or digital) which varies based on a corresponding change in at least one physiological parameter (20) of the animal (3) in which the bolus (2) resides. For the purposes of this invention the term "physiological parameter" means a measurable physiological condition (15) of an animal (3), and without limitation to the breadth of the foregoing, includes one or more of: geographic location, movement (including one or more of the pitch, yaw, roll, tilt, vibration, jolt, impact or the like), temperature, sound (including sounds generated by digestive track, heart, or the like), heart rate, pH, blood pressure, or the like.

As illustrative examples, at least one bolus sensor (18) suitable for use in particular embodiments include: a global positioning chip (29) for example PN XPOSYS PMB 2540 distributed by Infineon Technologies AG, an omnidirectional tilt and vibration sensor (30)(also referred to as an "accelerometer") for example PN SQ-SEN-200 distributed by Signal Quest Precision Microsensors; a temperature sensor (31) for example a Betachip Thermistor PN 1K2OG3 distributed by BetaTHERM Sensors; a microphone (32) for example PN MP34DT01 distributed by ST Microelectronics; a pressure transducer (33) for example PN COQ-062 distributed by Kulite, with inductance sensor, PN LDC1000 as distributed by Texas Instruments, or similar or equivalent sensors. The illustrative examples and description of these sensors are intended to provide a person of ordinary skill in the art sufficient information to make and use embodiments of the bolus (2) including a numerous and wide variety of bolus sensors (18) whether or not specifically enumerated.

The bolus memory element (21) and the bolus processor (22) in communication with the bolus memory element (21) can, but need not necessarily, be in the form of a microcontroller (35). An illustrative example of a microcontroller (35) suitable for use with embodiments of the invention may be obtained from Microchip Technology. Inc., 2355 West Chandler Blvd., Chandler, Arizona, Part Nos. PIC18LF14K22 or PIC18LF15K22. A bolus computer code (23) contained in the bolus memory element (21) can be executed to continuously or intermittently transform the analog or digital bolus sensor signal (24)(25) from the at least one bolus sensor (18) into encoded physiological parameter data (8) representing the physiological condition (15) or change in the at least one sensed physiological parameter (20). As to particular embodiments, the bolus computer code (23) can be periodically executed to encode or recode an amount of sensor calibration data (36) to which encoded physiological parameter data (8) for at least one sensed physiological parameter (20) can be compared to calculate and output a corresponding at least one physiological parameter value (13) of the animal (3) under varying physiological conditions (15). The bolus computer code (11) can be further executed to couple animal identification data (37) to the encoded physiological parameter data (8) or at least one physiological parameter value (13) allowing the data and values to be matched with the animal (3) in which the bolus (2) resides.

The bolus computer code (23) can be further executed to control a bolus communication signal generator (26) capable of generating a bolus communication signal (38) carrying the encoded physiological parameter data (8) or physiological parameter values (13) corresponding to at least one physiological parameter (20). For example, an oscillator can generate a stable bolus communication signal (38). An oscillator suitable for use with the invention may be available from Freescale Semiconductor, Part No. MC1319x, MC1320x, MC1321x, and MC1322x, or similar or equivalent oscillators. In regard to particular embodiments of the invention, the bolus communication signal generator (26) can generate a bolus communication signal (38) having a bolus communication signal frequency (39) of between about 410 MHz and about 1 Gz. As to one particular embodiment of the invention, the bolus communication signal generator (26) can generate a bolus communication signal frequency (39) of about 433 MHz. As to other particular embodiments, the bolus communication signal generator (26) can generate a bolus communication signal (38) having a bolus communication signal frequency (39) of between about 700 MHz to about 1 GHz. The bolus communication signal frequency (39) can be selected from the group including or consisting of: between about 700 MHz to about 800 MHZ, 750 MHz to about 850 MHz, about 800 MHz to about 900 MHz, 850 MHz to about 950 MHz, and about 900 MHz to about 1 GHz.

The bolus computer code (23) can further function to control a bolus communication signal frequency stabilizer (40)(shown in the example of FIG. 3 as a low pass filter (41) and a surface acoustic wave filter (42)) which functions to offset changes in the bolus communication signal (38) caused by fluctuations in temperature or power to or about the bolus communication signal generator (26). A bolus communication signal frequency stabilizer (40) suitable for use with embodiments is available from Hope Microelectronics Co., Ltd, Part No. HF433E, RF Monolithics, Inc., Part No. RF1172C, or similar or equivalent parts.

Embodiments of the bolus (2) can further include matching elements (43) which function to match the input impedance of the electrical load or the output impedance of the loads corresponding to the bolus communication signal generator (26)(or other signal source) to maximize the power transfer or minimize signal reflection from the load. In an ideal situation, source impedance and load impedance should be equal to maximize power transfer.

Three elements influence the balance of impedance in embodiments of the bolus (2): the antenna (44) or "load", the bolus communication signal generator (26) or "signal source", and the ground (45) or "ground plane". Since each of these elements have different physical characteristics, their corresponding impedances are inherently different. The passive capacitors (46) and inductors (47) that make up the resonant circuit (43) of embodiments of the bolus (2) are used to mitigate these differences and rebalance the impedance for a given bolus communication signal frequency (39). Impedance for an inductor (47) is given by, $$Z = iwL$$

where L is the inductance and w is angular frequency. Impedance for a capacitor (46) is given by, $$Z = \frac{1}{iwC}$$

where C is capacitance
The reactance is, $$X = \frac{-1}{wC}$$

The bolus matching elements (43) include an array of inductors (47) and capacitors (46) used in series or in parallel to balance the circuit impedance once the impedance of the antenna (44), the bolus communication signal generator (26), and the ground plane (45) are known.

A series resonant circuit (43) has an impedance that is the sum of the impedances of the inductor(s)(47) and capacitor(s)(46), $$Z = i\omega L + \frac{1}{i\omega C} = i\left(\omega L - \frac{1}{\omega C}\right)$$

The impedance of a parallel resonant circuit is found as follows, $$Z = i\left(\frac{\omega L}{1 - \omega^2 LC}\right)$$

Resonance in the resonant circuit (43) occurs when the resonant circuit (43) is driven at a frequency w0 at which the inductive and capacitive reactances are equal in magnitude. The frequency at which this equality holds for the resonant circuit (44) is called the resonant frequency, and can be determined, as follows, $$\omega_0 = \frac{1}{\sqrt{LC}}$$

This value can then be converted to hertz, $$f_0 = \frac{\omega_0}{2\pi} = \frac{1}{2\pi\sqrt{LC}}$$

The calculations above can be used to identify the inductors (47) and capacitors (46) used in the resonant circuit (43) in association with the bolus communication signal generator (26) that operates at a specific bolus communication signal frequency (39) to balance the impedance between the bolus communication signal generator (26), the antenna (44) and limiting the bandwidth to eliminate interference. After the bolus communication signal (38) passes through the resonant circuit (43) the resistance of the circuit can be altered to ensure an industry standard 50 ohm resistance in the transmission line to the antenna (44). The resistance of the circuit can be altered by inclusion of a resistor (48) to establish the standard 50 ohm resistance in the circuit.

Because the bolus communication signal generator (26) included in embodiments of the bolus (2) operate within the mass of an animal (3) and not free air, it has been discovered that the center frequency (49) (the arithmetic mean of the lower cutoff frequency and the upper cutoff frequency) is shifted lower and may not have the maximum gain.

Accordingly, there can be a substantial advantage, by selection of the inductors (47) and capacitors (46) as well as their position in the resonant circuit (43) to increase the inductance and capacitance values to purposefully shift the center frequency (49) upward and allowing the bolus communication signal frequency (39) to be re-tuned to the desired bolus communication signal frequency (39) by passing through the mass of the animal (3).

Now referring primarily FIGS. 2 through 5, embodiments of the bolus (2) further include an antenna (44) which converts electric power into the bolus communication signal (38). In transmission, the bolus communication signal generator (26) supplies an electric current oscillating at one of the above described bolus communication signal frequencies (39). In reception, the antenna (44) intercepts some of the power of a bolus programming signal (10) in order to produce a tiny voltage at its terminals that is applied to the a bolus communication signal receiver (27). As to particular embodiments, the antenna (44) can, but need not necessarily, be a laid down electrically conductive path (50) on a printed circuit board (51). An advantage of this configuration of antenna (44) can be that it does not require a winding upon a magnet or interaction with a magnetic field to transmit the bolus communication signal (38). Accordingly, this configuration of antenna (44) interacting with a magnetic field (52) of a magnet (53), which can but need not necessarily be contained within the bolus (2) can generate a lesser amount of interference which results in a greater consistency (or lesser amount of lost data) in transmission of encoded physiological parameter data (9) (or physiological parameter value (13) or animal identification data (37)) resulting in a lower incidence of loss of the bolus communication signal (38) or less modulation of the bolus communication signal (38).

Again referring primarily to FIGS. 2 through 5, particular embodiments of the antenna (44) can, but need not necessarily, include a first electrically conductive loop (54) electrically interconnected to a second electrically conductive loop (55) and electrically connected to the bolus communication generator (26) or bolus communication signal receiver (27)(or combined as a bolus communication signal transceiver (56)). As to particular embodiments, the first or the second or the pair of electrically conductive loops (54)(55) can each include a conductive sheet material (57) (or a laid down electrically conductive path (50) or electrically conductive layer) having an inner annular edge (58A) and an outer annular edge (58B) which join opposed loop faces (59)(60). Typically, the conductive sheet material (57) will be a copper sheet material or a copper layer. As to particular embodiments, the antenna (44) can further include a non-electrically conductive substrate (61) such as a circuit board (51) disposed between the pair of electrically conductive loops (54)(55) with one or more vias (62) electrically interconnecting the first and second electrically conductive loops (54)(55) by one or more holes (63) through the printed circuit board (51) or non-electrically conductive substrate (61). The one or more holes (63) can be made electrically conductive by electroplating, or by lining the hole with a tube or a rivet thereby electrically interconnecting the pair of electrically conductive loops (54)(55). There can be substantial advantages in structuring the antenna (44) as above described and as shown in FIGS. 4 through 5. First, the structure increases the cross-section width of the antenna (44) which increases the stability of a radiated electrical field (64) of the antenna (44). Second, the structure increases the bandwidth of the antenna (44) allowing shift in the bolus communication signal frequency (39) or attenuation resulting from passing through the mass of the animal (3) to be more readily counteracted. Third, the structure alters the magnetic field and electrical field generation which reduces the impact of uncontrollable changes in the orientation of the bolus (2) and correspondingly the orientation of the antenna (44) in the animal (3) or the reticulorumen (16) of a ruminant animal (3).

Again referring primarily to FIGS. 2 and 3, embodiments of the bolus (2) can further include a power source (65) and associated power regulator (66) which correspondingly supplies and adjusts energy (67)(electrical power) to the bolus (2). The power source (65) shown in the example of FIG. 2 can take the form of a battery such as a AA battery, a AAA battery, or the like. The power source (65) provides power to the electronic components supported on the printed circuit board (51) including for example: the microcontroller (35), bolus communication signal generator (26) and at least one bolus sensor (18). Because the power source (65) of a bolus (2) disposed in an animal (3), or in the reticulorumen (16) of a ruminant animal (3), cannot be recharged, the operational lifespan of bolus (2) will depend upon capacity of the power source (65) in ampere-hours (Ah) and the load current of the circuit. Power source (65) life will be longer as the load current is reduced and vice versa. The calculation to find out the capacity of a power source (65) in the form of a battery can be mathematically derived from the following formula:

Battery Life=Battery Capacity in amps per hour/load current in amps×0.70

As to particular embodiments of the bolus (2), the bolus computer code (23) can include a power management module (68) which functions to regulate energy (67) used by the bolus (2) to extend the operational life of the bolus (2) disposed in an animal (3) or reticulorumen (16) of the ruminant animal (3). Embodiments of the bolus (2), including particular embodiments of the power management module (68), can be operational within the an animal (3) for greater than three years and up to about ten years, a period of time substantially greater than that of a conventional bolus.

As one illustrative example, embodiments of the inventive bolus (2) can be orally administered to a calf at, or immediately after birth, and remain operational over the entire productive lifespan of the dairy cow, on average about 2.4 lactations, or about five to six years.

As another illustrative example, a ewe typically has a productive lifespan of between about five years to about seven years of age. A ewe's productivity usually peaks between 3 and 6 years of age and begins to decline after the age of seven. As a result, most ewes are removed from a flock before they would reach their natural life expectancy. Accordingly, embodiments of the bolus (2) disposed in the reticulorumen (16) of the ewe at birth can be operational throughout the entire productive lifetime of the ewe.

As to particular embodiments of the bolus (2), the power management module (68), can but need not necessarily include, an bolus activation element (69) which functions to enable at least one bolus sensor (18) and to encode the bolus sensor signal(s)(19) from the at least one sensor (18) and can further function to compare the one or more encoded sensor signals (19) against one or more preselected activation code(s)(70). If by comparison of the encoded sensor signal(s)(19) against the preselected activation code(s)(70), a pre-selected activation match threshold (71) is met, the bolus activation element (69) can further function to cause activation of the bolus (2) for normal operation. This provides the advantage of avoiding inadvertent or premature activation of the bolus (2) and the corresponding unnecessary expenditure of energy (67) from the power source (65).

As one illustrative example of the function of the bolus activation element (69), the bolus (2) can include a first bolus sensor (71) which can be an accelerometer (30). Accelerometers (30) in accordance with embodiments of the invention can sense the movement of the bolus (2)(whether within or without the animal), in a manner similar to accelerometers used in tablet computers and digital cameras, such that images on display screens are always displayed upright, or as used in drones for flight stabilization. The accelerometer (30) can be enabled by the function of the bolus activation element (69), and the bolus activation element (69) can further function to encode the first sensor signal (72) from the accelerometer (30) and compare the bolus first encoded sensor signal (72) against a first preselected activation code (73). The first preselected activation code (73), in the context of this illustrative embodiment, can correspond to a particular pre-activation movement (74) of the bolus (2) which can, but need not necessarily be, three serial reciprocal linear movements of the bolus (2) and which can but need not necessarily terminate in an impact of the bolus (2) within a period of time of between about five seconds and ten seconds (also referred as "three bumps"). If the pre-activation movement (74) of the bolus (2) including "three bumps" meets a first pre-selected activation match threshold (75) relating to the first preselected activation code (73) corresponding to "three bumps" the bolus activation element (69) can cause the bolus (2) to be activated for normal monitoring of the animal (3).

As to particular embodiments, the bolus (2) can, but need not necessarily, include an illumination element (76), such as a light emitting diode (77). The illumination element (76) can be switched on by operation of the bolus activation element (69) to provide an amount of light (107) as an indicator that the bolus (2) has been activated and can be administered or orally administered to a ruminant animal (3).

As to particular embodiments, the bolus activation element (69) having activated the bolus (2)(and as to particular embodiments, switched on the light illumination element (76)) can, but need not necessarily, further enable and encode a bolus second sensor signal (78) from a second bolus sensor (79) which can but need not necessarily be a temperature sensor (31). The bolus activation element (69) can further function to encode the bolus second sensor signal (78) from the bolus second sensor (79) and compare a bolus second sensor signal (78) against a bolus second preselected activation code (81). The bolus second preselected activation code (81), in the context of this illustrative embodiment, can correspond to a pre-activation temperature (82) of the bolus (2) which can, but need not necessarily be, three serial temperature reads of the bolus (2) each about 15 minutes apart within a period of time of about 45 minutes (also referred to as "three temperature reads"). If the pre-activation temperature (82) of the bolus (2) including "three temperature reads" meets a bolus second pre-selected activation match threshold (83) for the bolus second preselected activation code (81) corresponding to "three temperature reads" the bolus activation element (69) can cause the bolus (2) to be activated for normal monitoring of the animal (3). In the illustrative example of a bolus (2) used in calves or cows, if the three temperature reads are between about 100° F. (about 37.8° C.) and about 105°F (about 40.6° C.), this would be indicative that the bolus (2) resides in the reticulorumen (16) of a calf or cow, and the bolus activation element (69) can then function to cause the bolus (2) to be activated for normal monitoring of the animal (3). This provides the advantage of avoiding inadvertent or premature activation of the bolus (2) and the corresponding unnecessary expenditure of energy (67).

Temperature sensors or thermistors (31) in accordance with embodiments of the invention can sense a temperature (84) of the bolus (2)(whether within or without of the animal) in a useful range of temperature and accuracy depending upon the animal (3) into which the bolus (2) is to be administered and the determinations to be made from the sensed temperature (84). For example, the useful temperature range in dairy cow will be between about 95°F (about 35° C.) to about 115° F. (about 46° ° C.) with an accuracy of between about 0.1° C. and about 0.3° C. The normal temperature of an adult cow will typically be about 101.5° F. (about 38.5° C.), but can vary throughout the estrous cycle with the lowest temperature being just before heat and highest temperature on the day of heat or due to being in milk, and a temperature of about 103.0° F. (about 39.4° C.) to about 104.0°F (about 40° C.) and upward to about 108°F (about 42.2° C.), typically indicative of a sick cow. However, this illustrative example is not intended to preclude the use of thermistors (31) which may sense a wider temperature range, as one illustrative example, about −40° ° C. to about +125° C., as long as the accuracy is not less than about 0.1° C. to about 0.2° C. of the actual temperature about the bolus (2) and the time constant to change from one temperature value to another temperature value is sufficiently short to support the sampling rate of the bolus sensor signal (19) effected by the bolus computer code (23) in regard to the thermistor (31). For example, thermistors (31) utilized with embodiments of the bolus (2) may have a time constant of about one minute or less and while the sampling rate may be once every 10 minutes to 20 minutes or longer depending upon the application.

As to particular embodiments, the power management module (68) can, but need not necessarily, further function to reconfigure the mode of operation of the bolus (2) or allow the mode of operation of the bolus (2) to be reconfigured while residing in the animal (3) to regulate energy (67) use by the bolus (2) which can have the advantage of extending the operational life of the bolus (2).

Again referring primarily to FIGS. 1 through 3, as to particular embodiments, the power management module (68) can regulate energy (67) use by the bolus (2) by enabling or disabling one or more bolus sensors (18) based upon a pre-determined set of physiological parameters (20) to be sensed during one or more stages (85) in a lifespan (86) of the animal (3). The encoded physiological parameter data (8) useful in make determinations relating to an animal (3) may be different in a first stage (87) in the lifespan (86) of an animal (3)(for example, the time period between birth and puberty) as compared to a second stage (88)(for example, the time period commencing with puberty until the end of reproductive age (or useful reproductive age))(as shown in the example of FIG. 1). As one illustrative example in dairy cows, from the birth until puberty in dairy cows at about eight months to about seventeen months age depending upon the breed, the useful bolus physiological parameter data (8) may only include encoded physiological parameter data (8) relating to temperature (84). Accordingly, in a first stage (87) of the lifespan (86) of an animal (3) the power management module (68) can function upon activation of the bolus (2), as above described, to only enable and periodically read the bolus second sensor signal (78) and generate encoded physiological parameter data (8) for temperature (84) of the animal (3). Additionally, because the encoded physiological parameter data (8) for temperature (84) may only be used to determine whether the animal (3) is sick, there may be a substantial period of time between reads of the bolus second sensor signal (80), such as, once in a twenty four hour period. Similarly, there may be a substantial period of time between operational periods of the bolus communication signal generator (26), such as twenty four hours, and the operational period of the bolus communication signal generator (26) may be very short, such as, a few milliseconds (also referred to as a "transmission burst"). Because the majority of energy (67) used by the bolus (2) is in operation of the bolus communication signal generator (26), increasing the time period between transmission bursts and limiting the duration of the transmission burst only to that period of time necessary to transmit the limited amount of encoded physiological parameter data (8) can substantially increase the operating lifespan of the bolus (2).

By comparison, in second stage (88) of the lifespan (86) of an animal (3)(such as a cow) from puberty to the end of reproductive age of the animal (3), the useful encoded physiological parameter data (8) may include both physiological parameter data (8) for temperature (84) and physiological parameter data (8) for movement (89). As above explained, the temperature (84) of an animal (3) may vary throughout the estrous cycle with the lowest temperature being just before heat and highest temperature on the day of heat. Additionally, the movement (89) of the animal (3) can measurably change prior to or concurrent with heat.

Accordingly, as to particular embodiments, the power management module (68) can further include a timer element (90) which functions to assess elapsed time from activation of the bolus (2) allowing regulation of energy (67) use by the bolus (2) based on elapsed time which can be coordinated to one or more of the stages (85) in the lifespan (86) of the animal (3). As one illustrative example, if the bolus (2) is orally administered at birth the timer element (90) and the power management module (68) can function to enable a bolus first sensor (71)(or first set of bolus sensors (18)) providing useful encoded physiological parameter data (8) during the first stage (87)) and encode physiological parameter data (8) for temperature (84)(or first set of physiological parameters (20)) for a period of time corresponding the first stage (87) of the lifespan (86) of the animal (3)(for example, between birth and puberty) and then function to further enable a bolus second sensor (79)(or second set of bolus sensors (18) providing useful encoded physiological parameter data (20) during a second stage (88) of the animal (3)) and encode physiological parameter data (20) for both temperature (84) and movement (89).

Additionally, because the encoded physiological parameter data (20) for movement (89) and temperature (84) may be used to determine whether the animal (3) is in estrus, the power management module (68) can function to reduce the period of time between reads of the bolus sensor signal (19) for temperature (84) and the bolus sensor signal (19) for movement (89), for example, four times in a twenty four hour period. Similarly, there may be a lesser period of time between operational periods of the bolus communication signal generator (26), such as every six hours, and the operational period of the bolus communication signal generator (26) may be adjusted to a period of time to transmit the additional encoded physiological parameter data (20).

As to particular embodiments, once the animal (3) becomes pregnant and during the pregnancy, the power management module (68) can further function to reconfigure the operation of the bolus (2) to disable the bolus first sensor (71) for movement (89) and read only the bolus second sensor (79) for temperature (84) and transmit encoded physiological parameter data (20) at less frequent intervals.

As to particular embodiments, the bolus program code (23) can be reprogrammed while the bolus (2) resides in the animal (3)(or reticulorumen (16) of the ruminant animal (3)) by receiving bolus programming data (10) to reconfigure the power management module (68) to regulate energy (67) use by the bolus (2), as above described.

As to particular embodiments, the power management module (68) can, but need not necessarily, include a power sensor element (91) executable to determine the remaining amount of energy (67) in the power source (65). The power management module (68) can be further executed to determine the amount of energy (67) required to power the bolus (2) through a pre-determined period of time (92) based on the then existing bolus program code (23) contained in the bolus memory element (21) of the bolus (2). The power management module (68) can be further executed to compare the remaining amount of energy (67) in the power source (65) with the amount of energy (67) required to power the bolus (2) through the pre-determined period of time (92) based on the then existing bolus program code (23) to determine the difference in the amount of energy (67) remaining in the power source (65) and the amount of energy (67) required to power the bolus (2) through the pre-determined period of time (92). The power management module (86) can be further executed to perform one or more power regulation events (93) to make up the difference in the amount of energy (67) to allow operation of the bolus (2) through the pre-determined period of time (92). The power regulation events (93) can include or consist of one or more of: switching off the light illumination element (76), increasing the interval of time between operation of the bolus communication signal generator (26), decreasing the operational time period of the bolus communication signal generator (26), disabling one or more of the plurality of bolus sensors (18), interrupt encoding of the bolus sensor signal (18) from one or more of said plurality of bolus sensors (18), or other re-programming that reduces use of energy (67).

As to particular embodiments, the power management module (68) can be pre-programmed to perform one or more of the power regulation events (93) in one or more pre-programmed priority orders based upon the magnitude of the difference in the amount of energy (67) remaining in the energy source (65) and the required amount of energy (67) to power the bolus (2) through the remaining portion of a pre-programmed or re-programmed life cycle. Alternately, the power management module (68) can function to encode and transmit as part of a transmission burst, encoded power source data (94) from which the remaining amount of energy (67) in the energy source (65) can be calculated using a remote processor (11) and the power management module (68) can be re-programmed to execute one more power regulation events (93) based on a priority order encoded in the bolus programming data (10) received by the bolus (2).

Again referring primarily to FIGS. 1 through 3, embodiments of the bolus (2) can, but need not necessarily, include an inert bolus body (17). As to particular embodiments, the inert bolus body (17) can have an outer most external surface (95) with external dimensional relations adapted to allow oral administration and retention of the bolus (2) in the reticulorumen (16) of a ruminant animal (3). As one non-limiting example, an inert bolus body (17) can include an amount of plastic resin (96) cast about the animal monitoring assembly (216) ("AMA"), including one or more of the components above-described. The amount of plastic resin (96) can be, as illustrative examples, a plastic resin such as urethane resin, epoxy resin, polyester resin, or the like used in accordance with the manufacturer's instructions. As to other embodiments, the inert bolus body (17) can comprise a sealable housing (97) defining a hollow inside space (98) which receives the AMA (216). As to other embodiments, the sealable housing (97) including the AMA (216) received in the hollow space (98)(and as to particular embodiments further including one or more magnets (53) received in the hollow space (98)) can have the amount of plastic resin (96) cast about the AMA (216) (and one or more magnets (53)) located inside said sealable housing (97).

Now referring primarily to FIG. 2, configurations of the inventive bolus (2) suitable for oral administration to a ruminant animal (3) can have a generally cylindrical configuration with a diameter (99) in orthogonal cross section to the longitudinal axis (100) in the range of about one-half inch (about 13 millimeters ("mm")) to about one and one quarter inch (about 32 mm) and having a bolus length (101) disposed between a bolus first end (102) and a bolus second end (103) in the range of about two inches (about 50 mm) and about five inches (about 127 mm). Particular embodiments of the bolus (2) can have a length of about four inches (about 102 mm) and a diameter (99) of about one inch (about 25 mm).

While the example of FIG. 2 shows the bolus (2) including a sealable housing (97) having matable halves (104)(105) with an outer most external surface (95) configured as a cylinder; the bolus (2) can have numerous and varied outer most external surface (95) configurations capable of oral administration and retention within the reticulorumen (16) of a ruminant animal (3). The inert bolus body (17) can be molded, cast, or machined from biocompatible (or biologically inert) non-magnetic materials which allow transmission of the bolus communication signal (38) from within the bolus (2) to outside of the ruminant animal (3). As examples, the inert bolus body (17) can be made from plastics such as nylon, fluorocarbon, polypropylene, polycarbonate, urethane, epoxy, polyethylene, or the like; or metals such as stainless steel; or other materials such as glass can be utilized. The bolus (2) having a hollow inside space (98) can be generated by a wide variety of procedures such as molding, casting, fabrication or the like. As one non-limiting example, a cylindrical tube having an external diameter and an internal diameter, as above described, can be divided into sections of suitable length to which end caps can be fitted. Alternately, a bore can be made in a cylindrical solid rod having an external diameter, as above described, to provide a closed end tube with the bore having sufficient dimension to provide the hollow inside space (98).

Now referring primarily to FIGS. 2 and 3, as to particular embodiments, the inert bolus body (2) can, but need not necessarily, include a translucent or transparent element (106) to allow viewing of the amount of light (107) generated by the illumination element (76) as a viewable indicator (108) that the bolus is activated as above described. The translucent or transparent element (106) can include a portion or the entirety of the housing (97) of the inert bolus body (17).

Now referring to primarily to FIGS. 1 and 2, as to particular embodiments of the bolus (2), the inert bolus body (17) can be configured for oral administration to ruminant animals (3) at birth. The digestive track between the mouth (109) and the reticulorumen (16) of a ruminant animal (3) at birth can have comparatively restrictive dimensions as compared to adult ruminant animals (3). Therefore, a conventionally configured bolus may not be orally administered to ruminant animals (3) at birth or when orally administered may cause injury or be regurgitated as the digestive track between the mouth (109) and the reticulorumen (16) enlarges due to growth of the ruminant animal (3). The configuration of the outer most external surface (95) of the housing (97) of the inert bolus body (17) or the bolus density (110), or combinations thereof, can be critical when a bolus (2) is orally administered to a ruminant animal (3) at birth. It has been discovered that while the bolus length (101) between the bolus first and second ends (102)(103) can be more variable, it can be critical that the greatest bolus diameter (99) (or width) of the outer most external surface (95) along the length (101) between the pair of bolus ends (102)(103) should be between one half inch (about 13 mm) and not exceed three quarters of an inch (about 19 millimeters). The configuration of the outer most external surface (95) of the bolus (1) can have a bolus diameter (99) (or width in housings (97) non-circular in cross section) selected from the group including or consisting of: about 13 mm to about 15 mm, about 14 mm to about 16 mm, about 15 mm to about 17 mm, about 16 mm to about 18 mm, and about 17 mm to about 19 mm.

Now referring primarily to FIG. 2, as one illustrative example, a bolus (2) configured for oral administration to ruminant animals (3) at birth can have an outer most external surface (95) of the bolus body (17) having cylindrical configuration. The bolus length (101) can vary between about three inches (about 76 mm) and about six inches (about 152 mm) between the a pair of bolus ends (102)(103); however, the outer most external surface (95) at any cross section orthogonal to the longitudinal axis (100) of the bolus (2) should not exceed about 19 millimeters. As a second illustrative example, the bolus body (17) can be substantially spherical having an external diameter not exceeding about three quarters of an inch (about 19 mm).

Embodiments of the inventive bolus (2) can, but need not necessarily, have a bolus density (110) of between about 2.1 grams per cubic centimeter ("g/cm$^3$") to about 3.3 g/cm$^3$. However, there can be substantial advantages in configuring the bolus (2) to achieve a bolus density (110) in the range of between about 2.1 g/cm$^3$ to about 3.3 g/cm$^3$ in that the bolus (2) is substantially less likely to be regurgitated or ejected from reticulorumen (16) of a ruminant animal (3) as compared to conventional bolus having a bolus density outside of this inventive range. It can be critical to achieve a bolus density (110) of between about 2.1 g/cm$^3$ to about 3.3 g/cm$^3$ when dimensions of the outer most external surface (95) are reduced for oral administration to ruminant animals (3) at birth or the bolus (2) resides in the reticulorumen (16) of the ruminant animal (3) for the entire lifespan (86) of the ruminant animal (3). Within the range of bolus density (110), the bolus density can be selected from the group including or consisting of: about 2.3 g/cm$^3$ to about 2.5 g/cm$^3$, about 2.4 g/cm$^3$ to about 2.6 g/cm$^3$, about 2. g/cm$^3$ to about 2.7 g/cm$^3$, about 2.6 g/cm$^3$ to about 2.8 g/cm$^3$, about 2.7 grams g/cm$^3$ to about 2.9 g/cm$^3$; about 2.8 g/cm$^3$ to about 3.0 g/cm$^3$, about 2.9 g/cm$^3$ to about 3. g/cm$^3$; about 3.0 g/cm$^3$ to about 3.2 g/cm$^3$, and about 3.1 g/cm$^3$ to about 3.3 g/cm$^3$.

The Tag. Now referring primarily to FIGS. 1, 6 and 7, embodiments of the invention can, but need not necessary, include a tag (4) having a tag housing (111) configured to be removably or permanently affixed to an animal external surface (112) of an animal (3) by a securement element (113), with certain embodiments having a configuration capable of being attached to the animal (3) immediately after birth. While the embodiment of the tag (4) shown in FIGS. 1 and 6 includes a tag housing (111) configured to include a neck collar (114) which can be secured around a neck (115) of an animal (3), there are situations where neck collars (114) may not be appropriate. Accordingly, the tag housing (111) can be configured to include a leg collar (116) which can be secured around a pastern (117), or between the knee (118) or the hock (119) and the hoof (120) of an animal (3). As to particular embodiments, the tag housing (111) can be configured to be secured to an ear (121) of the animal (3). As to particular embodiments, the tag housing (111) can include a securement element (113) in the form of matable securement halves (122)(123) joined through the ear (121) which locate the tag housing (111) on the ear inside surface (124) or hanging from the securement element (113). Other configurations of securement elements (113) can be utilized depending upon the location on the animal external surface (112) of the animal (3) to which the tag housing (111) is affixed.

Figure 6:
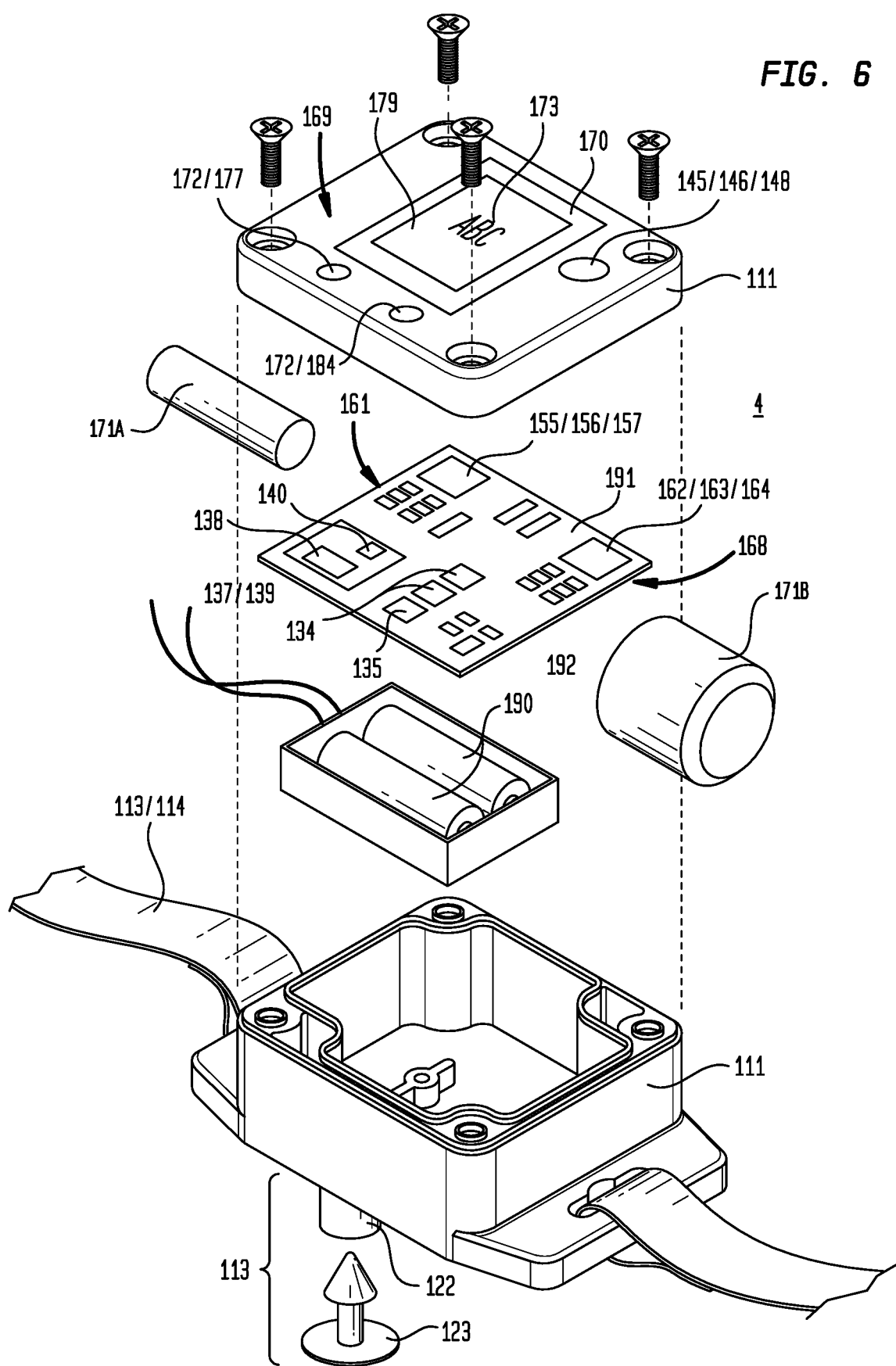
FIG. 6 is an exploded view of a particular embodiment of a tag.
Figure 7:
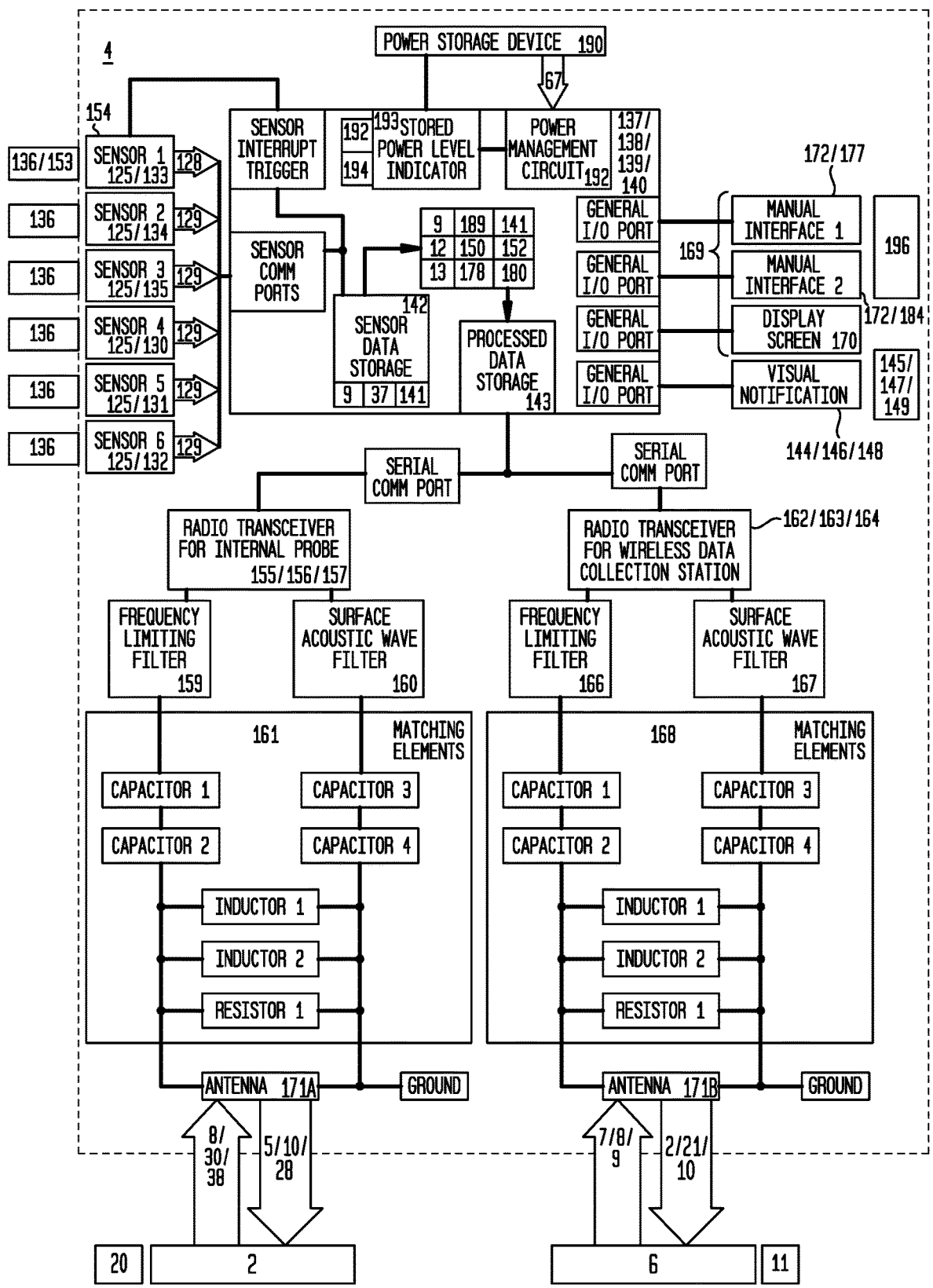
FIG. 7 is a block diagram of the particular embodiment of the tag shown in FIG. 6.

Now referring primarily to FIGS. 6 and 7, embodiments of the tag (4) can, but need not necessarily, include at least one tag sensor (125) capable of generating a tag sensor signal (126) which varies based on change in a corresponding sensed environmental parameter (136) outside of or surrounding the animal (3). Illustrative examples of a tag sensor (125) can, but not necessarily, include: a tag global positioning chip (127), for example, PN XPOSYS PMB 2540 distributed by Infineon Technologies AG, a tag omnidirectional tilt and vibration sensor (128)(also referred to as an "accelerometer"). for example, PN SQ-SEN-200 distributed by Signal Quest Precision Microsensors; a tag temperature sensor (129), for example, such as a Betachip Thermistor PN 1K2OG3 distributed by BetaTHERM Sensors; a tag microphone (130) distributed by ST Microelectronics (PN MP34DT01); a tag pressure transducer (131), for example, PN COQ-062 distributed by Kulite, a tag inductance sensor (132) PN LDC1000 distributed by Texas Instruments.

The illustrative examples and description of these tag sensors (125) are intended to provide a person of ordinary skill in the art sufficient information to make and use embodiments of the tag (4) including a numerous and wide variety of tag sensors (125) whether or not specifically enumerated. While the illustrative example of FIG. 7, includes a first tag sensor (133), a second tag sensor (134), and a third tag sensor (135), embodiments of the tag (4) can include a lesser or greater number of tag sensors (125) depending upon the application.

Now referring primarily to FIGS. 6 and 7, which show an illustrative example of a tag (4) which includes at least one tag sensor (125) each capable of generating at least one tag sensor signal (126)(whether analog or digital) which varies based on a corresponding change in at least one environmental parameter (136) of the animal (3) on which the tag (4) resides. For the purposes of this invention the term "environmental parameter" means a measurable environmental (14) condition of the environment surrounding an animal (3), and without limitation to the breadth of the foregoing, includes one or more of: geographic location, movement (including one or more of the pitch, yaw, roll, tilt, vibration, jolt, impact or the like), temperature, sound, proximity to metal, or the like.

The tag (4) can further include a tag memory element (137) and a tag processor (138) in communication with a tag memory element (137), which can, but need not necessarily, be in the form of a tag microcontroller (139). An illustrative example, a tag microcontroller (139) suitable for use with embodiments of the invention may be obtained from Microchip Technology. Inc., 2355 West Chandler Blvd., Chandler, Arizona, Part Nos. PIC18LF14K22 or PIC18LF15K22. A tag computer code (140) contained in the tag memory element (137) can be executed to continuously or intermittently transform the analog or digital tag sensor signal (126) from the at least one tag sensor (129) into encoded environmental parameter data (9) representing the condition or change in the sensed environmental parameter (136). As to particular embodiments, the tag computer code (140) can be executed periodically to encode or recode an amount of tag sensor calibration data (141) to which encoded environmental parameter data (9) for at least one environmental parameter (136) can be compared to calculate and output a corresponding at least one environmental parameter value (12) under varying environmental conditions (14). The tag computer code (140) can be further executed to couple animal identification data (37) to the encoded environmental parameter data (9) and at least one environmental parameter value (12) allowing the environmental parameter data (9) and values (12) to be matched with the animal (3) to which the tag (4) is affixed. The tag memory element (137) can, but need not necessarily, include a first tag database (142) in which encoded environmental parameter data (9) can be stored. The tag computer code (140) can be applied to the stored encoded environmental parameter data (9) to transform the stored encoded environmental parameter data (9) into at least one environmental parameter value (12) which can be stored and retrieved from a tag second database (143) of the tag memory element (137).

As to particular embodiments, the tag computer code (140) can, but need not necessarily, be executed to periodically poll each tag sensor (125) for a duration of time to collect environmental parameter data (9) and compare the environmental parameter data (9) or values (12) to corresponding preselected indicator element activation values (189) for each environmental parameter (136). In the event that an environmental parameter value (12) meets or exceeds a corresponding preselected indicator element activation value (189), the tag computer code (140) can be executed to operate a tag indicator element (144). The tag indicator element (144) can be operable by execution of the tag computer code (140) to provide a sensorially perceivable indicia (145). As illustrative examples, the tag indicator element (144) can be a light emitting element (146) such as a light emitting diode which upon operation emits light (147) or can be a sound emitting element (148) such as a speaker which upon operation emits sound (149). As to particular embodiments, the tag computer code (140) can, but need not necessarily, be executed to periodically poll each tag sensor (125) and each bolus sensor (18) for a duration of time and compare the physiological parameter data (8) or values (13) and environmental parameter data (9) or values (12) to corresponding preselected indicator activation values (189) for each physiological parameter (20) or environment parameter (136). In the event that a physiological parameter value (13) or an environmental parameter value (12) meets or exceeds a corresponding preselected indicator element activation value (189), the tag computer code (140) can be executed to operate the tag indicator element (144) to emit the sensorial perceivable indicia (145).

As to particular embodiments, the tag computer code (140), can but need not necessarily, include an indicia cessation element (150) which upon execution terminates operation of the tag indicator element (144). As one illustrative example of the function of the indicia cessation element (150), the tag (4) can include a tag first sensor (133) which can be a tag accelerometer (128). Tag accelerometers (128) in accordance with embodiments of the invention can sense the movement of the tag (4), in a manner similar to accelerometers (128) used in tablet computers and digital cameras, such that images on display screens are always displayed upright, or as used in drones for flight stabilization. The tag computer code (140) can further function to encode the tag first sensor signal (151) from the accelerometer (128) and compare the first sensor signal (151) against a first preselected indicia cessation element code (152). The first preselected cessation code (152), in the context of this illustrative embodiment, can correspond to a particular indicia cessation movement (153) of the tag (4) which can, but need not necessarily be, three serial reciprocal linear movements of the tag (4) in one or more preselected axis of tag movement (154) within a period of time, for example, between about five seconds and ten seconds. If the preselected indicia cessation movement (153) of the tag (4) meets the first preselected cessation code (152) the tag computer code (140) can be further executed to terminate operation of the tag indicator element (144).

The tag computer code (140) can be further executed to control a tag first communication signal generator (155) and a tag first communication receiver (156)(or combined as a tag first communication signal transceiver (157)) operable to communicate with the bolus (2) residing inside of the animal (3) to receive encoded physiological parameter data (9) or physiological parameter values (13) corresponding to at least one physiological parameter (20). Accordingly, the first tag communication signal generator (155) and tag first communication receiver (157) can be configured to communicate with the bolus (2) at a first tag communication signal frequency (158) (or frequencies), which can be the same as above described, for the bolus communication signal frequency (39). The tag first communication signal generator (155) and the first tag communication receiver (156) can, but need not necessarily, include components as above described for the bolus communication signal generator (26) and bolus communication receiver (27) (or bolus communication transceiver (56)), or include similar or equivalent components, to the extent necessary to achieve the first tag communication signal frequency (158) which can, but need not necessarily, include one or more of a tag low pass filter (159) and a tag surface acoustic wave filter (160) which functions to offset changes in the tag first communication signal (5) caused by changes in temperature or power to the tag first communication signal generator (155) similar or equivalent to the bolus low pass filter (41) and the bolus surface acoustic wave filter (42), tag first resonance circuit (161) similar or equivalent to the bolus resonance circuit (43), a tag first antenna (171A) which can be similar or equivalent to the bolus antenna (44).

The tag computer code (140) can, but need not necessarily, be further executed to control a tag second communication signal generator (162) and a tag second communication receiver (163)(or a combined as a tag second communication signal transceiver (164)) operable to communicate with one or more remote signal transceiver(s)(6) ("RST") to send encoded physiological parameter data (8) or physiological parameter values (13) corresponding to at least one physiological parameter (20) and environmental parameter data (9) or environmental parameter values (12) corresponding to at least one environmental parameter (136) and to receive a bolus programming signal (28) carrying a bolus programming data (10) to the tag (4) affixed to the external surface of the animal (3) to reprogram the bolus (2) to or from one or more remote processors (11), as further described below.

The tag second communication signal generator (162) and tag second communication receiver (163) can be configured to communicate with the RST (6) at a tag second communication signal frequency (165) or frequencies. The tag second communication generator (162) and the tag second communication receiver (163) can, but need not necessarily, include components as above described for the bolus communication signal generator (26) and bolus communication signal receiver (27) (or bolus communication transceiver (56)), or include similar or equivalent components, to the extent necessary to achieve the tag second communication signal frequency (165) which can, but need not necessarily, include one or more of a tag second low pass filter (166) and a tag second surface acoustic wave filter (167) which function to offset changes in the tag second communication signal (7) caused by changes in temperature or power to the tag second communication signal generator (162) similar or equivalent to the bolus low pass filter (41) and the bolus surface acoustic wave filter (42), a tag second matching elements (168) similar or equivalent to the bolus resonance circuit (43), or an tag second antenna (171B) which can be similar or equivalent to the bolus antenna (44). The tag second communication generator (162) and tag second communication receiver (163) can be configured to communicate in one or more operating forms, illustrative examples including: code division multiple access used in many mobile phone standards such as cdmaOne, CDMA2000, WCDMA or the like, Bluetooth®, a sub Gighertz radio operating at a frequency of between about 800 MHz to about 950 MHz, wireless signal operating at a frequency of about 2.4 GHz, or the like.

Now referring primarily to FIGS. 6 and 7, embodiments of the tag (4) can, but need not necessarily, include a manual user interface (169) including user interface input elements (172) and a display surface (170) each of which can be disposed in the tag housing (111) to allow interaction by a user (196). The user interface input elements (172) can be interoperable with the display surface (170) to allow a user (196) to execute various functions of the tag computer code (140) to control, re-program or monitor operations of the tag (4), and the bolus (2) communicatively coupled to the tag (4). The user interface input elements (172) can be adapted to receive manual user inputs through one or more of sound, touch, or detected displacement, and without limitation to the breadth of the foregoing, user interface input elements (172) can be in the form of keys, buttons, touch screen, speech recognition hardware, or the like or combinations thereof.

Now referring primarily to FIGS. 6, 7 and 8A and 8A' through 8X and 8X', the display surface (170) can be adapted to display human readable indicia (173)(as shown in the example of FIG. 6) to allow user interaction in one or more menus (179) which allow a particular bolus (2) to be communicatively paired with a particular tag (4), selection of parameter control fields (181) to input parameter control values (175) corresponding to particular physiological parameters (20) or environmental parameters (136), and access to physiological values ((12) and environmental values (13) calculated directly by the tag (4) or the bolus (2) or indirectly by a remote processor (11) communicatively coupled to the tag (4) or the bolus (2)(as shown in the example of FIG. 1).

For the purposes of the present invention, the term "indicia" refers to markings displayed on the display surface (170) of the tag housing (111) that may be understood by a human. Human readable indicia (173) may take the form of letters, numbers, symbols, shapes, colors, or the like or any combination thereof understandable by a human. Indicia (173) may also correspond to or be translatable into a particular number or letter, or any combination of numbers or letters that may be interpreted by a human. For example, the sequential combination of a blue triangle, red square and yellow circle could stand for the alpha-numeric code 17A, with the blue triangle standing for 1, the red square for 7 and the yellow circle for A.

For the purposes of this invention, the term "human-readable" refers to indicia that may be understood by a human. Human-readable indicia may be read by a human using the naked eye, or, given the size of the indicia with the aid of one or more optical magnifying lenses, a still camera, a movie camera, a video-recorder, or the like that may be used to aid a human in reading the indicia.

Again referring primarily to FIGS. 6, 7 and 8A and 8A' through 8X and 8X', as one illustrative example, the manual user interface (169) can include a first manual user interface element (177) and a second manual user interface element (184) such as a key, button, or touch surface which executes a menu navigation module (178) of the tag computer code (140). User interaction with the first manual user interface element (177) and the second manual user interface element (184) causes a navigation module (178) of the tag computer code (140) to retrieve and correspondingly serially display one or more menus (179)(serially identified 179A, 179B, 179C, 179D, 179E et seq.) on the display surface (170). A first user interaction with the first manual user interface element (177)(such as: push, displace, touch, utterance, or the like or combination thereof) can cause the a navigation module (178) to retrieve and display a first menu (179A) including a one or more parameter control fields (181) each containing a parameter control value (175). A menu cursor (185) can be positioned in one of the parameter control fields (181). One or more additional interactions with the first manual user interface element (172) causes the navigation module (178) to serially advance the menu cursor (185) through the one or more parameter control fields (181) returnable to the parameter control field (181) in which the menu cursor (185) was originally positioned. As to particular embodiments, the one or more parameter control fields (181) can be displayed in a menu first column (187) each adjacent a corresponding parameter value field (182) containing a parameter value (183) (whether a physiological parameter value (20) or an environmental parameter value (136)) displayed in a menu second column (188). The term menu cursor (185) for the purposes of this invention means a movable indicator such as an underline, a stylized figure, a dot, a spot of highlighting or highlighting of an entire field, or other indicator of the user's (196) current position within the one or more menus (179) and which position can be affected by user interaction with the manual user interface (169). User interaction with the second manual user interface element (184) causes selection of the parameter control value (175) contained in the parameter control field (181).

Now referring to FIGS. 8A and 8A' through FIGS. 8X and 8X', as one illustrative example, the one or more menus (179) can each include a menu first column (187) including one or more parameter control fields (181) each containing a selectable control value (175) (as shown in the example of 8A) and a menu second column (188) including one or more parameter value fields (182) each containing one or more current parameter values (183) (as shown in FIG. 8A').

Now referring to FIGS. 8A and 8A', a first operation of the first manual user interface (177) presents a first menu (179A) and further serial operation of the first manual user interface (177) advances a menu cursor (185) in a menu first column (187) through a one or more parameter control fields (181) adjacent a menu second column (188) including related parameter value fields (182) each containing one or more current parameter values (183). As shown in FIGS. 8A and 8A', operation of the first manual user interface (177) advances the menu cursor (185) in the menu first column (187) between parameter control fields (181) (as shown in the example of FIGS. 8A and 8A' the menu cursor (185) advances from the parameter control field containing "ID Number" to the parameter control filed containing "Days In Milk"). The parameter value (183) for "Days In Milk" is adjacently displayed in the parameter value field (182) in the menu second column (188) (as shown in the example of FIGS. 8A and 8A' the parameter value is "0"). Each additional operation of the first manual user interface (177) serially advances the menu cursor (185) through a plurality of parameter control fields (181) (as shown in the example of FIG. 8A "ID Number", "Days In Milk", "Days Since Heat", "Sensor Data". "Settings") and returnable to the first parameter control field (181) in the menu first column (187) (as shown in the example of 8A "ID Number").

Now referring to FIGS. 8B and 8B', once the user (196) has positioned the menu cursor (185) in one of the plurality of parameter control fields (181) in the menu first column (187) (shown in FIG. 8B as "Days in Milk"), then by one operation of the second manual user interface element (184) the control field (181) can be selected causing display of a second menu (179B) in which one or more parameter control fields (181) can be displayed in a menu first column (187) and corresponding operating parameter fields (186) can be displayed in a menu second column (188) which relate to the selected parameter control value (175) of the first menu (179) ("Days In Milk")(as shown in the example of FIG. 8B').

Now referring to FIGS. 8C and 8C', once the second menu (179B) is displayed, operation of the first manual user interface element (177) advances the menu cursor (185) in the menu first column (187) through one or more parameter control fields (181) containing corresponding parameter control values (175) (as shown in the example of FIG. 8C the user advances the menu cursor (185) to the parameter control field (181) containing the parameter control value (175) "Yes" adjacent either one of two operating parameter fields (186) containing operating parameters (174) in the menu second column (188) "Drying Off" or "Calving"). Operation of the second manual user interface (184) causes selection of the parameter control value (175) of the parameter control field (181) in which the menu cursor (185) is positioned (as shown in the example of FIG. 8C'). Selection of the parameter control value (175) "Yes" for the operating parameter (174) "Calving" activates the tag computer code (14) to generate the corresponding parameter value (183) in the first menu (179A) second column (188). For example, selection of the parameter control value (175) "Yes" corresponding to the operating parameter (174) "Calving" activates a counting module (180) of the tag computer code (140) to count "Days In Milk". Operation of the first manual user interface (177) advances the menu cursor (185) in the menu first column (187) of the second menu (179B) to "Exit" and operation of the second user interface (184) causes return to the first menu (179A). The parameter value (183) for the parameter control value (175) "Days In Milk" is reported in days in the menu second column (as shown in the example of 8C' the parameter value for "Days In Milk" is "1" and upwardly number each consecutive day by operation of the counting module (180)).

Now referring to FIGS. 8D and 8D', 8E and 8E' and 8F and 8F', once the first menu (179) is displayed (as shown in the example of FIG. 8D) then by serial operation of the first manual user interface (177) the menu cursor (185) can be advanced to other parameter control fields (181)(as shown in the example of FIG. 8D' "Days Since Heat") and by operation of the second manual user interface (184) the parameter control value (175) can be selected (as shown in the example of FIG. 8E) causing display of a second menu (179B)(as shown in the example of FIG. 8E'). Operation of the first manual user interface (177) advances the menu cursor (185) in the menu first column (187) of the second menu (179B) to allow selection of one of parameter control values (175) displayed on the menu first column (187) adjacent the corresponding operating parameter (174) contained in the operating parameter field (186) in the menu second column (188)(as shown in the Example of FIG. 8E' the menu cursor is advanced to "Yes" adjacent the operating parameter (174) "In Heat"). Operation of the second manual user interface (184) causes selection of the parameter control value (175) ("Yes") and activates the counting module (180) to count days "In Heat". Operation of the first manual user interface (177) advances the menu cursor (185) to "Exit" and operation of the second user interface (184) causes return to the first menu (179A). The parameter value (183) (counted days since heat) is displayed in the parameter value field (182) of the menu second column (188) adjacent the parameter control field (181) containing the parameter control value (175) "Days Since Heat" (as shown in the example of 8F').

Now referring to FIGS. 8G and 8G', 8H and 8H', 8I and 8I', once the first menu (179A) is displayed (as shown in the example of FIG. 8G) then by serial operation of the first manual user interface (177) the menu cursor (185) can be advanced to another parameter control field (181)(as shown in the example of FIG. 8G' "Sensor Data") and operation of the second manual user interface (184) causes selection of the parameter control field (181) containing the parameter control value (175) "Sensor Data" (as shown in the example of FIG. 8H) causing display of second menu (179B) in which environmental parameter values (12) and physiological parameter values (13) are plotted against elapse of time (as shown the example of FIG. 8H' "Animal Temperature", "Ambient Temperature" and "Animal Activity" are plotted over time). Operation of the first manual user interface (177) advances the menu cursor (185) to "Exit" (as shown in the example of FIG. 8I) and operation of the second user interface (184) causes return to the first menu (179A)(as shown in the example of FIG. 8I' with current environmental and physiological values (12)(13) displayed in the parameter value field (182)).

Now referring to FIGS. 8J and 8J', 8K and 8K' and 8L and 8L', 8N and 8N', 8O and 8O', once the first menu (179A) is displayed (as shown in the example of FIG. 8J) then by serial operation of the first manual user interface (177) the menu cursor (185) can be advanced to another parameter control field (181) (as shown in the example of FIG. 8J' "Settings") and operation of the second manual user interface (184) causes selection of the parameter control value (175) (as shown in the example of FIG. 8K selection of "Settings") and display of a second menu (179B) in which parameter control fields (181) containing parameter control values (175) are displayed in a menu first column (187) adjacent corresponding operating parameter fields (186) containing operating parameters (174) (as shown the example of FIG. 8K'). Subsequent operation of the first manual user interface (177) advances the menu cursor (185) in the menu first column (187) to select one of the plurality of parameter control values (175) (as shown in the Example of FIG. 8L the menu cursor can be advanced to "Yes" adjacent the operating parameter field (186) containing the operating parameter (174) "Internal Device" relating operation of the bolus (2) or "Yes" adjacent the operating parameter field (186) containing the operating parameter (174) "External Device" relating to operation of the tag (4)). Operation of the second manual user interface (184) can cause display of a third menu (179C) having a menu first column (187) including one or more parameter control fields (181) each containing a parameter control value (175) and a menu second column (188) including one or more operating parameter fields (186) each containing an operating parameter (174) (as shown in the example of FIG. 8L' three operational parameters (174) for the bolus (2) are listed in the menu second column (188) "Temperature", "Movement", and "Microphone"). Operation of the first manual user interface (177) advances the menu cursor (185) between the parameter control fields (181)(as shown in the example of 8M' the cursor can be advanced to the parameter control value (175) "On" adjacent the operating parameter (174) "Movement"). Operation of the second manual user interface (184) causes the selected parameter control value (175) to be toggled between "On" and "Off" (as shown in the example of FIG. 8M' and FIG. 8N). Operation of the first manual user interface (177) advances the menu cursor (185) between other parameter control fields (181) on the menu first column (187)(as shown in the example of Figure N' the menu cursor is advanced to parameter control value (175) "15 Minutes" adjacent the operating parameter (174) "Temperature" displayed in the menu second column (188)). Operation of the second manual user interface (184) can cause display of a third menu (179C) which displays parameter control values (175) related to the operating parameter (174) for "Temperature" (as shown in the example of FIG. 8O selectable periods of time between temperature reads by the bolus (2) are "15 Min", "30 Min", "60 Min"). Operation of the first manual user interface (177) advances the menu cursor (185) between selectable parameter control values (175) for the operating parameter (174) of "Temperature" (as shown in the example of FIG. 8O). Operation of the second manual user interface (184) can cause selection of the parameter control value (175) (as shown in the example of FIG. 8O' "30 Minutes"). Operation of the first manual user interface (177) advances the menu cursor (185) to "Exit" and operation of the second user interface (184) causes return to the first menu (179A).

Now referring to FIGS. 8P and 8P', 8Q and 8Q' and 8R and 8R', once the first menu (179A) is displayed then by serial operation of the first manual user interface (177) the menu cursor (185) can be advanced to another parameter control field (181)(as shown in the example of FIG. 8P to "ID Number") and operation of the second manual user interface (184) can cause selection of the parameter control value (175) (as shown in the example of FIG. 8P') and display of a second menu (179B) including one or more parameter control fields (181) in a menu first column (187) and one or more operating parameter fields (186) in a menu second column (188) (as shown the example of FIG. 8Q). Operation of the first manual user interface (177) advances the menu cursor (185) between the plurality of parameter control fields (181) each containing a parameter control value (175) adjacent a corresponding plurality of operating parameter fields (186) each containing an operating parameter (174) (as shown in the Example of FIG. 8Q the menu cursor (185) can be advanced to "Yes" adjacent the operating parameter (174) "Internal Device Pairing"). Operation of the second manual user interface (184) can cause display of a third menu (179C) which displays selectable parameter control values (175) in the menu first column (187) adjacent the operating parameter (174) displayed in the menu second column (188)(as shown in the example of FIG. 8Q' one of two parameter control values (175) "1000001" and "1000002" are displayed adjacent "Pairing: Select Device"). Operation of the first manual user interface allows the menu cursor (177) to be advanced between the selectable parameter control values (175)(as shown in the example of 8R the cursor can be advanced to "1000002"). Operation of the second manual user interface (184) can cause selection of the parameter control value (175) causing the parameter control value (175) associated with a bolus (2) to be paired with the tag (4)(as shown in the example of FIG. 8R' showing that the bolus (2) "100002" is paired with the tag (4)). Operation of the first manual user interface (177)

advances the menu cursor (185) to "Exit" and operation of the second user interface (184) causes return to the first menu (179A).

Now referring primarily to FIGS. 8S and 8S', 8T and 8T' and 8U and 8U' once the first menu (179A) is displayed then by serial operation of the first manual user interface (177) the menu cursor (185) can be advanced to a parameter control field (181) (as shown in the example of FIG. 8S "ID Number") and operation of the second manual user interface (184) can cause selection of the parameter control field (181) and display of a second menu (179B) in which parameter control fields (181) can be displayed in the menu first column (187) adjacent corresponding operational parameter fields (186)(as shown in the example of FIG. 8S'). Operation of the first manual user interface (177) advances the menu cursor (185) in the menu first column (187) between the plurality of parameter control fields (181)(as shown in the example of FIG. 8T the menu cursor (185) been advanced to the parameter control field (181) containing the parameter control value (175) "ID Number" adjacent the operating parameter field (186) containing the operating parameter (174) "Animal ID"). Operation of the second manual user interface (184) causes selection of the parameter control value (175) "ID Number" and causes display of a third menu (179C) including a menu first column (187) in which one or more additional parameter control fields (181) containing selectable parameter control values (175) and a menu second column (188) including operating parameter fields (186) containing operating parameters (174) (as shown in the example of FIG. 8T' the parameter control value (175) "Yes" can be selected for the operating parameter "Enter ID"). Operation of the second manual user interface (184) selects the parameter control value (175) "Yes" causing display of a fourth menu (179D) (as shown in the example of FIG. 8U' the fourth menu (179D) can be in the form of a key pad (179E)). Operation of the first manual user interface (177) advances the menu cursor (185) in the key pad fields (179E') and operation of the second manual user interface (184) causes selection of a keypad alpha-numeric value (179E") corresponding to key pad field (179E') in which the menu cursor (185) is positioned allowing selection of an ID Number to be associated with paired bolus (2) and tag (4). Operation of the first manual user interface (177) advances the menu cursor (185) to "Exit" and operation of the second user interface (184) causes return to the first menu (179A).

Now referring primarily to FIGS. 8V and 8V', 8W and 8W' and 8X and 8X' once the first menu (179A) is displayed then by serial operation of the first manual user interface (177) the menu cursor (185) can be advanced to another parameter control field (181) (as shown in the example of FIG. 8V "ID Number") and operation of the second manual user interface (184) causes selection of the associated parameter control value (175) and display of a second menu (179B)(as shown in the example of FIG. 8V'). Operation of the first manual user interface (177) advances the menu cursor (185) in the menu first column (187) through plurality of parameter control fields (181) (as shown in the Example of FIG. 8W the menu cursor (181) can be advanced to the parameter control field (181) containing the parameter control value (175) "Communication Method" adjacent the operational parameter field (186) containing the operating parameter (174) "Communication"). Operation of the second manual user interface (184) causes display of a third menu (179C) which displays additional parameters control fields (181) containing parameter control values (175) in the menu first column (187) corresponding to operating parameters (174) contained in operating parameter fields (186) adjacently displayed in the menu second column (188) (as shown in the example of FIG. 8W' the parameter control value "No" is adjacent each of the operating parameters (174) "Local Collector", "Active Cellular", or "Connect Bluetooth"). Operation of the first manual user interface (177) advances the menu cursor (185) between the selectable parameter control fields (181) in the menu first column (187) (as shown in the example of FIG. 8X). Operation of the second manual user interface (184) causes selection of the parameter control value (175) (as shown in the example of FIG. 8X' selection of the parameter control value (175) causes toggle between "No" and "Yes" in the parameter control field (181)). Operation of the first manual user interface (177) advances the menu cursor (185) to "Exit" and operation of the second user interface (185) causes return to the first menu (179A).

Again referring primarily to FIGS. 6 and 7, embodiments of the tag (4) can further include a tag power source (190)(and associated tag power regulator (191)) which supplies and adjusts energy (67) electrical power) to the tag (4). The tag power source (190) shown in FIGS. 6 and 7 can take the form of a battery such as a AA battery, a AAA battery, or the like. The power source (190) provides power to the electronic components supported on a tag printed circuit board (191) including for example: the tag microcontroller (139), tag first communication signal generator (155), tag second communication signal generator (162) and at least one tag sensor (125).

As to particular embodiments, the tag power management module (192) can, but need not necessarily, include a tag power sensor element (193) executable to determine the remaining amount of energy (67) in the tag power source (190) and generate a corresponding tag power source energy value (194). A preselected power source energy value (195) can be entered into the tag (4) and the tag computer code (140) can be executed to periodically determine and compare the power source energy value (194) to the preselected power source energy value (195). In the event that the power source energy value (194) falls below the preselected power source energy value (195), the tag computer code (140) can be executed to cause the tag indicator element (144) to emit sensorially perceivable indicia (145), as above described.

The Remote Signal Transceiver. Now referring primarily to FIGS. 1 and 9, the animal monitoring system (1) can, but need not necessarily, include one or more RSTs (6) located to receive the bolus communication signal (38) or the tag second communication signal (7) carrying the physiological parameter data (8) from one or more bolus (2) or environmental parameter data (9) from one or more tags (4). As to particular embodiments, the one or more RSTs (6) can further operate to assemble the encoded physiological parameter data (8) or the environmental parameter data (9) into one or more data packets (194) which can be transmitted and received by a wired or wireless reception device (195) (which can be integrated into a remote processor (11)). The reception device (195) can transfer the data packets (194) to the remote processor (11). The remote processor (11) can operate to transform the animal identification data (37), the physiological parameter data (8), and the environmental parameter data (9) to output an animal identification value (176) (an alpha or numeric or other animal identifier), physiological parameter values (13)(an alpha or numeric or other symbols), or environmental parameter values (12).

The Remote Processor. Now referring generally to FIGS. 1, 3, 7 and 9, embodiments of the invention can, but need not necessary, include a remote processor (11) configured as to certain embodiments to communicatively couple with the bolus (2) and as certain embodiments communicatively couple with the tag (4) or both, whether directly, or indirectly via one or more RSTs (6) on frequencies corresponding to the bolus communication signal (38) or the tag second communication signal (7) to obtain or generate animal identification values (176), physiological parameter values (13) and environmental values (12) accessible by a remote processor user (196) and to transmit a bolus programming signal (28) carrying bolus programming data (10) to a tag (4)(as to certain embodiments) or to the bolus (2)(as to certain embodiments) to reprogram the bolus (2)

For the purposes of this invention the term "remote processor" means any suitable type of electronic device. As illustrative examples, the remote processor (11) can include a portable electronic device that a remote processor user (196) may hold in a hand, such a personal e-mail device (for example, a Blackberry® made available by Research in Motion of Waterloo, Ontario), a personal data assistant, a cellular telephone, a tablet computer, laptop computer, a desktop computer, or the like.

The remote processor (11) may be described herein in terms of functional block components, screen shots, and various process steps. It should be appreciated that such functional blocks may be realized by any number of hardware or software components configured to perform the specified functions.

Similarly, the software elements of the present invention may be implemented with any programming or scripting language such as C, C++, Java, COBOL, assembler, PERL, Labview or any graphical user interface programming language, extensible markup language (XML), Microsoft's Visual Studio .NET, Visual Basic, or the like, with the various algorithms or Boolean Logic being implemented with any combination of data structures, objects, processes, routines or other programming elements. Further, it should be noted that the present invention might employ any number of conventional wired or wireless techniques for data transmission, signaling, data processing, network control, and the like.

It should be appreciated that the particular computer implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in the animal environmental and physiological monitoring system (1).

As will be appreciated by one of ordinary skill in the art, the present invention may be embodied in the alternative as a method, a data processing system, a device for data processing, a computer program product, or the like. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, ROM, flash RAM, or the like.

It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer or other programmable data processing apparatus to produce a machine, such that the instructions which execute on the computer or other programmable data processing apparatus for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of elements for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware based computer systems which perform the specified functions or steps, or suitable combinations of special purpose hardware and computer instructions.

Again referring to FIGS. 1, 3, 7, and 9, an illustrative remote processor (11) can include at least one processing unit (197), a memory unit (198), and a bus (199) which operably couples components of the remote processor (11), including, without limitation the memory unit (198) to the processing unit (197). The remote processor (11) may be a conventional computer, a distributed computer, or any other type of computer which may contain all or a part of the elements described or shown to accomplish the functions described herein; the invention is not so limited. The processing unit (197) can comprise without limitation one central-processing unit (CPU), or a plurality of processing units which operate in parallel to process digital information, or a digital signal processor (DSP) plus a host processor, or the like. The bus (199) can be without limitation any of several types of bus configurations such as a memory bus or memory controller, a peripheral bus, and a local bus using any of a variety of bus architectures. The memory unit (198) can without limitation be a read only memory (ROM)(200) or a random access memory (RAM)(201), or both. A basic input/output system (BIOS)(202) containing routines that assist transfer of data between the components of the remote processor (11), for example during start-up, can be stored in ROM (200). The remote processor (11) can further include one or more of a hard disk drive (203) for reading from and writing to a hard disk (204), a magnetic disk drive (205) for reading from or writing to a removable magnetic disk (206), and an optical disk drive (207) for reading from or writing to a removable optical disk (208) such as a CD ROM or other optical media.

The hard disk drive (203), magnetic disk drive (205), and optical disk drive (207) and the reception device (195) can be connected to the bus (199) by a hard disk drive interface (209), a magnetic disk drive interface (210), and an optical disk drive interface (211). A signal reception device (195) can be connected to the bus (199) by a signal reception device interface (212), respectively. The drives and their associated computer-readable media provide nonvolatile storage of computer-readable instructions, data structures, program modules and other data for the remote processor (11). It can be appreciated by those skilled in the art that any type of computer-readable media that can store data that is accessible by a computer, such as magnetic cassettes, flash memory cards, digital video disks, Bernoulli cartridges, random access memories (RAMs), read only memories (ROMs), RFID devices or the like, may be used in the exemplary operating environment.

The remote processor (11) can further include an operating system (213) and an animal monitoring program (214) ("AMP") which as to particular embodiments of the invention can include an AMA encoder-decoder module (215) for programming the animal monitoring assembly (AMA)(216) with animal identification data (37) or reprogram certain operating parameters of the AMA. As to particular embodiments, programming of the AMA (216) can be accomplished using an animal monitoring assembly programmer (217) connected to the bus (199) by an AMA interface (218). The AMA encoder-decoder module (215) can be stored on or in the hard disk (204), magnetic disk (206), optical disk (208), ROM (200), in RAM (201) of the remote processor (11) or alternately the functionalities of the AMA encoder-decoder module (215) may be implemented as an application specific integrated chip (ASIC) or file programmable gate array (FPGA), or the like.

As to particular embodiments, the remote processor (11) can be further configured to generate bolus programming data (10) based on remote processor user (196) interaction the AMP (214) which can be received by the RST (6) over a local area network (219) over a wide area network (220). The RST (6) can generate an RST communication signal (221) to carry the bolus programming data (10) to the tag second communication receiver (163) contained in the tag (4). The RST communication signal (221) can be processed by the tag microcontroller (139) and the tag (4) can utilize the tag first communication signal (5) to reprogram the bolus computer code (23) and particularly the power management module (68) to correspondingly alter the operation of the AMA (216), regardless as to whether the bolus (2) containing the AMA (216) has a location outside of the animal (3) or has a location inside of the animal (3).

The remote processor user (196) can enter commands and information into the remote processor (11) through input devices (222) such as a keyboard (223) and a pointing device (224) such as a mouse. Other input devices (not shown) may include for example: a touch screen, a microphone, joystick, game pad, satellite dish, scanner, magnetic strip of a card, or the like. These and other input devices are often connected to the processing unit (197) through a serial port interface (225) that can be coupled to the bus (199), but may be connected by other interfaces, such as a parallel port, game port, or a universal serial bus (USB). A monitor (226) or other type of display device can also be connected to the bus (199) via interfaces such as a video adapter (227), or the like.

In addition to the monitor (226), the remote processor (11) can further include peripheral output devices (232), such as speakers and printers.

The remote processor (11) may operate in a networked environment using logical connections to one or a plurality of remote processors (11) These logical connections can be achieved by a communication device (228) coupled to or a part of the remote processor (11). Each of the plurality of remote processors (11) can include a part or all of the elements as included in the remote processor (11) although only a single box has been illustrated in FIG. 9 for the plurality of remote processors (11).

When used in a local networking environment, the remote processor (11) can be connected to a local area network (229)("LAN") through a network interface (230). When used in a WAN-networking environment, the remote processor (11) typically includes a modem (231), or other type of communications device, for establishing communications over the WAN (220), such as the Internet. The modem (231), which may be internal or external to the remote processor (11), can be connected to the bus (199) via a serial port interface (225). In a networked environment, the AMP (214), or portions thereof, may be stored in any one or more of the plurality of remote processors (11). It is appreciated that the logical connections shown are exemplary and other hardware elements and communications elements can be utilized for establishing a communications link between a plurality of remote processors (11).

As can be easily understood from the foregoing, the basic concepts of the present invention may be embodied in a variety of ways. The invention involves numerous and varied embodiments of an animal environmental and physiological monitoring system and methods for making and using such animal environmental and physiological monitoring system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "generator" should be understood to encompass disclosure of the act of "generating"—whether explicitly discussed or not—and, conversely, were there effectively disclosure of the act of "generating", such a disclosure should be understood to encompass disclosure of a "generator" and even a "means for generating." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the animal environmental and physiological monitoring systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A method for monitoring an animal, comprising:
orally administering a bolus to an animal,
generating a bolus sensor signal that varies based on change in at least one physiological parameter of said animal;
encoding said bolus sensor signal in a memory element of the bolus;
generating a bolus communication signal carrying the encoded bolus sensor data;
securing a tag to an external surface of said animal;
receiving with the tag said bolus communication signal carrying said encoded bolus sensor data;
generating a tag first communication signal at a tag first communication signal frequency carrying bolus programming data to said bolus; and
generating a tag second communication signal at a tag second communication signal frequency carrying encoded bolus sensor data to a remote processor.

2. The method of claim 1, further comprising generating a sensorially perceivable indicia upon the occurrence of a pre-selected indicator element activation value of a physiological parameter value.

3. The method of claim 2, further comprising sensorially perceiving indicia generated upon the occurrence of said pre-selected indicator element activation value of said physiological parameter value.

4. The method of claim 1, wherein said tag further includes a manual user interface including a display surface and at least one user interface input element, said at least one user interface input element interoperable with one or more menus displayed on said display surface to allow a user to execute or reprogram computer code on the tag or computer code on the bolus.

5. The method of claim 4, further comprising communicatively pairing said tag and said bolus by interoperation of said at least one user interface input element with said one or more menus displayed on said display surface of said manual use interface.

6. The method of claim 5, further comprising activating a counting module to count days in milk by interoperation of said at least one user interface input element with said one or more menus displayed on said display surface of said manual use interface.

7. The method of claim 5, further comprising activating a counting module to count days since last heat by interoperation of said at least one user interface input element with said one or more menus displayed on said display surface of said manual use interface.

8. The method of claim 5, further comprising displaying physiological data collected over a period of time by interoperation of said at least one user interface input element with said one or more menus displayed on said display surface of said manual use interface.

9. The method of claim 5, further comprising altering operating parameters of said bolus by interoperation of said at least one user interface input element with said one or more menus displayed on said display surface of said manual use interface.

10. The method of claim 9, further comprising altering operating parameters of said tag by interoperation of said at least one user interface input element with said one or more menus displayed on said display surface of said manual use interface.

11. The method of claim 1, further comprising locating a remote signal transceiver to receive said tag second communication signal carrying said encoded bolus sensor data.

\* \* \* \* \*